United States Patent
Feldman et al.

(10) Patent No.: US 9,953,392 B2
(45) Date of Patent: Apr. 24, 2018

(54) MULTIMEDIA SYSTEM AND ASSOCIATED METHODS

(71) Applicant: T1V, INC., Charlotte, NC (US)

(72) Inventors: Michael R. Feldman, Huntersville, NC (US); James E. Morris, Lake Wylie, SC (US)

(73) Assignee: T1V, Inc., Charlotte, NC (US)

( * ) Notice: Subject to any disclaimer, the term of this patent is extended or adjusted under 35 U.S.C. 154(b) by 0 days.

(21) Appl. No.: 14/634,373

(22) Filed: Feb. 27, 2015

(65) Prior Publication Data

US 2015/0170327 A1 Jun. 18, 2015

Related U.S. Application Data

(63) Continuation-in-part of application No. 13/841,883, filed on Mar. 15, 2013, which is a continuation-in-part of application No. 13/353,283, filed on Jan. 18, 2012, which is a continuation-in-part of application No. 12/650,684, filed on Dec. 31, 2009, now Pat. No. 8,600,816, which is a continuation-in-part of application No. 12/588,774, filed on Oct. 27, 2009, now abandoned, which is a continuation-in-part of application No. 12/222,670, filed on Aug. 13, 2008, now Pat. No. 8,583,491.

(60) Provisional application No. 60/994,458, filed on Sep. 19, 2007, provisional application No. 61/272,591, filed on Oct. 9, 2009, provisional application No.
(Continued)

(51) Int. Cl.
*G06T 1/20* (2006.01)
*G06F 3/038* (2013.01)
*G06Q 10/10* (2012.01)
*H04N 7/14* (2006.01)

(52) U.S. Cl.
CPC ............... *G06T 1/20* (2013.01); *G06F 3/038* (2013.01); *G06Q 10/101* (2013.01)

(58) Field of Classification Search
USPC ........................................................ 345/173
See application file for complete search history.

(56) References Cited

U.S. PATENT DOCUMENTS

| | | |
|---|---|---|
| 5,412,564 A | 5/1995 | Ecer |
| 5,589,856 A | 12/1996 | Stein et al. |
| 5,694,150 A | 12/1997 | Sigona |

(Continued)

FOREIGN PATENT DOCUMENTS

| | | |
|---|---|---|
| CN | 1904823 A | 1/2007 |
| JP | 3086974 U | 10/2002 |

(Continued)

OTHER PUBLICATIONS

Steelecase: Media:scape brochure, © 2010.
(Continued)

*Primary Examiner* — Garcia Ade
(74) *Attorney, Agent, or Firm* — Lee & Morse, P.C.

(57) ABSTRACT

A system including a large format display, a display computer storing a plurality of files to be displayed on the display, and a mobile device application loaded onto a mobile device, the mobile device application to load and store user information for more than one user, to generate a list of user information, and to share the list of user information with the display computer and other mobile devices having the mobile device application thereon.

11 Claims, 31 Drawing Sheets

Related U.S. Application Data

61/433,681, filed on Jan. 18, 2011, provisional application No. 61/521,081, filed on Aug. 8, 2011.

(56) References Cited

U.S. PATENT DOCUMENTS

| | | | |
|---|---|---|---|
| 5,825,352 A | 10/1998 | Bisset et al. | |
| 5,825,353 A | 10/1998 | Will | |
| 5,896,126 A | 4/1999 | Shieh | |
| 5,943,043 A | 8/1999 | Furuhata et al. | |
| 6,128,649 A | 10/2000 | Smith | |
| 6,301,564 B1 | 10/2001 | Halverson | |
| 6,396,506 B1 | 5/2002 | Hoshino et al. | |
| 6,424,248 B1 | 7/2002 | Toms et al. | |
| 6,498,590 B1 | 12/2002 | Dietz et al. | |
| 6,517,437 B1 | 2/2003 | Wells et al. | |
| 6,529,786 B1 | 3/2003 | Sim | |
| 6,731,731 B1 | 5/2004 | Ueshima | |
| 6,844,893 B1 | 1/2005 | Miller et al. | |
| 6,856,259 B1 | 2/2005 | Sharp | |
| 6,876,973 B1 | 4/2005 | Visconti | |
| 6,920,431 B2 | 7/2005 | Showghi et al. | |
| 6,940,394 B2 | 9/2005 | Gagnon | |
| 6,973,437 B1 | 12/2005 | Olewicz et al. | |
| 6,975,910 B1 | 12/2005 | Brown et al. | |
| 6,980,999 B1 | 12/2005 | Grana | |
| 6,982,733 B1 | 1/2006 | McNally et al. | |
| 7,069,228 B1 | 6/2006 | Rose et al. | |
| 7,163,311 B2 | 1/2007 | Kramer | |
| 7,242,389 B1 | 7/2007 | Stern | |
| 7,254,775 B2 | 8/2007 | Geaghan et al. | |
| 7,385,479 B1 | 6/2008 | Green et al. | |
| 7,487,461 B2 | 2/2009 | Zhai et al. | |
| 7,535,481 B2 | 5/2009 | Dehlin | |
| 7,549,921 B2 | 6/2009 | Storm | |
| 7,572,223 B2 | 8/2009 | Donaldson | |
| 7,620,901 B2 | 11/2009 | Carpenter et al. | |
| 7,656,393 B2 | 2/2010 | King et al. | |
| 7,874,923 B2 | 1/2011 | Mattice et al. | |
| 7,920,159 B2* | 4/2011 | Ueno | H04N 7/15 348/14.08 |
| 7,925,996 B2 | 4/2011 | Hofmeister et al. | |
| 7,976,372 B2 | 7/2011 | Baerlocher et al. | |
| 7,980,858 B2 | 7/2011 | Valoe et al. | |
| 8,046,701 B2 | 10/2011 | Chiu et al. | |
| 8,147,316 B2 | 4/2012 | Arezina et al. | |
| 8,326,115 B2 | 12/2012 | Murakoshi et al. | |
| 8,350,814 B2 | 1/2013 | Kim et al. | |
| 8,368,616 B1 | 2/2013 | Harris | |
| 8,403,740 B2 | 3/2013 | Kovacs et al. | |
| 8,439,756 B2 | 5/2013 | Baerlocher et al. | |
| 8,493,339 B1 | 7/2013 | Feehan | |
| 8,525,799 B1 | 9/2013 | Grivna | |
| 2002/0112237 A1 | 8/2002 | Kelts | |
| 2002/0185981 A1 | 12/2002 | Dietz | |
| 2002/0191029 A1 | 12/2002 | Gillespie | |
| 2003/0016844 A1 | 1/2003 | Chisato | |
| 2003/0020671 A1 | 1/2003 | Santoro | |
| 2003/0025678 A1 | 2/2003 | Lee | |
| 2003/0058214 A1 | 3/2003 | Abboud | |
| 2003/0063073 A1 | 4/2003 | Geaghan | |
| 2003/0078793 A1 | 4/2003 | Toth | |
| 2003/0182209 A1 | 9/2003 | Ge et al. | |
| 2003/0210277 A1 | 11/2003 | Harada | |
| 2004/0001048 A1 | 1/2004 | Kraus et al. | |
| 2004/0046784 A1 | 3/2004 | Shen | |
| 2005/0030255 A1 | 2/2005 | Chiu | |
| 2005/0091302 A1 | 4/2005 | Soin et al. | |
| 2005/0183023 A1 | 8/2005 | Maruyama et al. | |
| 2005/0215303 A1 | 9/2005 | Inoue | |
| 2005/0257160 A1 | 11/2005 | Debellis et al. | |
| 2005/0259378 A1 | 11/2005 | Hill | |
| 2006/0028398 A1 | 2/2006 | Willmore | |
| 2006/0101354 A1 | 5/2006 | Hashimoto et al. | |
| 2006/0117197 A1 | 6/2006 | Nurmi | |
| 2006/0125799 A1 | 6/2006 | Hillis et al. | |
| 2006/0181519 A1 | 8/2006 | Vernier | |
| 2006/0238724 A1* | 10/2006 | Trivedi | G11L 331/00 353/119 |
| 2006/0267952 A1 | 11/2006 | Alcorn | |
| 2006/0294247 A1 | 12/2006 | Hinckley | |
| 2007/0097092 A1 | 5/2007 | Jung | |
| 2007/0129150 A1 | 6/2007 | Crowder et al. | |
| 2007/0171273 A1 | 7/2007 | Saleh et al. | |
| 2007/0220444 A1 | 9/2007 | Sunday | |
| 2007/0236478 A1 | 10/2007 | Geaghan et al. | |
| 2007/0247435 A1 | 10/2007 | Benko et al. | |
| 2007/0257891 A1 | 11/2007 | Esenther et al. | |
| 2007/0273670 A1 | 11/2007 | Nordahl | |
| 2007/0279227 A1 | 12/2007 | Juels | |
| 2007/0291710 A1 | 12/2007 | Fadell | |
| 2008/0022328 A1* | 1/2008 | Miller | H04N 21/41415 725/86 |
| 2008/0036743 A1 | 2/2008 | Westerman et al. | |
| 2008/0088593 A1 | 4/2008 | Smoot | |
| 2008/0113767 A1 | 5/2008 | Nguyen et al. | |
| 2008/0119237 A1 | 5/2008 | Kim | |
| 2008/0122796 A1 | 5/2008 | Jobs et al. | |
| 2008/0165132 A1 | 7/2008 | Weiss | |
| 2008/0171602 A1 | 7/2008 | Patel et al. | |
| 2008/0192059 A1 | 8/2008 | Kennedy | |
| 2008/0198138 A1 | 8/2008 | McFarlane et al. | |
| 2008/0214273 A1 | 9/2008 | Snoddy et al. | |
| 2008/0215852 A1 | 9/2008 | Largman et al. | |
| 2008/0282286 A1 | 11/2008 | Or | |
| 2009/0076920 A1 | 3/2009 | Feldman et al. | |
| 2009/0084612 A1 | 4/2009 | Mattice et al. | |
| 2009/0085894 A1 | 4/2009 | Gandhi et al. | |
| 2009/0088203 A1 | 4/2009 | Havens et al. | |
| 2009/0094561 A1 | 4/2009 | Do | |
| 2009/0100129 A1 | 4/2009 | Vigil et al. | |
| 2009/0104965 A1 | 4/2009 | House et al. | |
| 2009/0106667 A1 | 4/2009 | Lyle et al. | |
| 2009/0118005 A1 | 5/2009 | Kelly et al. | |
| 2009/0122022 A1 | 5/2009 | Park et al. | |
| 2009/0143141 A1* | 6/2009 | Wells | G07F 17/32 463/37 |
| 2009/0144556 A1 | 6/2009 | Plet et al. | |
| 2009/0150824 A1 | 6/2009 | Furuichi | |
| 2009/0156179 A1 | 6/2009 | Hahn et al. | |
| 2009/0183098 A1 | 7/2009 | Casparian et al. | |
| 2009/0193366 A1 | 7/2009 | Davidson | |
| 2009/0213091 A1 | 8/2009 | Davidovici | |
| 2009/0231281 A1 | 9/2009 | Whytock et al. | |
| 2009/0249235 A1 | 10/2009 | Kim | |
| 2010/0001967 A1 | 1/2010 | Yoo | |
| 2010/0031202 A1 | 2/2010 | Morris et al. | |
| 2010/0083109 A1 | 4/2010 | Tse et al. | |
| 2010/0083110 A1 | 4/2010 | Scott et al. | |
| 2010/0085323 A1 | 4/2010 | Bogue | |
| 2010/0097342 A1 | 4/2010 | Simmons et al. | |
| 2010/0106607 A1 | 4/2010 | Riddiford et al. | |
| 2010/0113140 A1 | 5/2010 | Kelly et al. | |
| 2010/0118112 A1 | 5/2010 | Nimri et al. | |
| 2010/0127992 A1 | 5/2010 | Schmid | |
| 2010/0130280 A1 | 5/2010 | Arezina et al. | |
| 2010/0179864 A1 | 7/2010 | Feldman et al. | |
| 2010/0185681 A1 | 7/2010 | Han | |
| 2010/0193258 A1 | 8/2010 | Simmons et al. | |
| 2010/0194703 A1 | 8/2010 | Fedor et al. | |
| 2010/0283747 A1 | 11/2010 | Kukulski | |
| 2011/0055729 A1 | 3/2011 | Mason | |
| 2011/0138284 A1 | 6/2011 | Wigdor | |
| 2011/0216064 A1 | 9/2011 | Dahl | |
| 2011/0293094 A1 | 12/2011 | Os et al. | |
| 2011/0296508 A1 | 12/2011 | Os et al. | |
| 2012/0162351 A1 | 6/2012 | Feldman et al. | |
| 2013/0055113 A1 | 2/2013 | Chazin et al. | |
| 2013/0127688 A1 | 5/2013 | Amiya et al. | |
| 2013/0132885 A1 | 5/2013 | Maynard et al. | |

FOREIGN PATENT DOCUMENTS

| | | |
|---|---|---|
| JP | 2005-339006 A | 12/2005 |
| JP | 2006-065558 A | 3/2006 |

(56) References Cited

FOREIGN PATENT DOCUMENTS

| WO | WO 97/035248 A1 | 9/1997 |
| --- | --- | --- |
| WO | WO 00 16863 A1 | 3/2000 |
| WO | WO 01 37163 A1 | 5/2001 |
| WO | WO 2006/043255 A2 | 4/2006 |

OTHER PUBLICATIONS

Shen, et al., DiamondSpin: An Extensible Toolkit for Around-the-Table Interaction, Proceedings of the 2004 Conference on Human Factors in Computing Systems , CHI '04, Jan. 1, 2004 (Jan. 1, 2004), pp. 167-174, XP055121855, New York, New York, USA.
PCT Search Report in PCT/US2010/52308, dated Nov. 23, 2010 (Feldman, et al.).
Extended European Search Report; EP 08832576.6 dated Feb. 29, 2012.
EP 1st Examination Report; EP 08832576.6 dated May 17, 2013.
International Search Report for PCT/US2012/021777, dated Aug. 1, 2013 (Feldman, et al.).
Extended European Search Report; EP 10 82 2836 dated Jun. 13, 2014.
Japanese Office action for JP 2012-533388 dated Aug. 5, 2014.
Chinese Office action for CN 201080055793.7 dated Aug. 4, 2014.
International Search Report for PCT/US2014/030206, dated Oct. 31, 2014 (Feldman, et al.).
USPTO Final Rejection dated Nov. 2, 2016 for U.S. Appl. No. 13/974,458.
USPTO Final Rejection dated Nov. 23, 2016 for U.S. Appl. No. 14/049,929.

\* cited by examiner

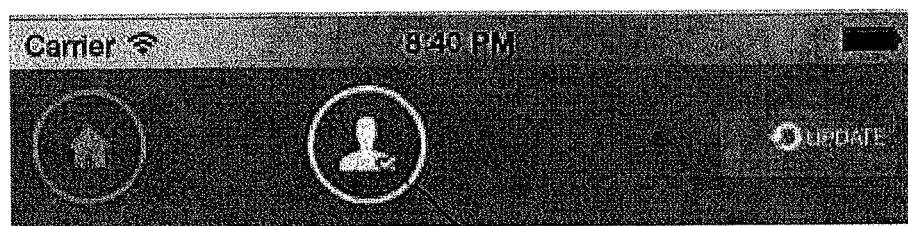 —310
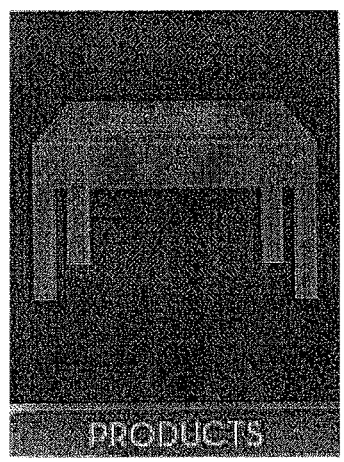
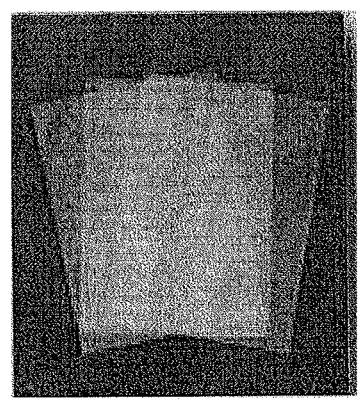
FIG. 24

MULTIMEDIA SYSTEM AND ASSOCIATED METHODS

CROSS-REFERENCE TO RELATED APPLICATIONS

The present application claims priority under 35 U.S.C. § 119(e) to U.S. Provisional Application Ser. No. 60/994,458, entitled "Multimedia Restaurant and Booth", filed on Sep. 20, 2007, to U.S. Provisional Application Ser. No. 61/272,591, entitled "Multimedia, Multiuser System and Associated Methods", filed Oct. 9, 2009, to U.S. Provisional Application Ser. No. 61/433,681, entitled "Multimedia, Multiuser System and Associated Methods," filed Jan. 18, 2011, and to U.S. Provisional Application No. 61/521,081, entitled "Table and Monitor for Wireless Display of Mobile Devices," filed Aug. 8, 2011, and is a continuation-in-part of U.S. patent application Ser. No. 13/841,883 filed on Mar. 15, 2013, entitled "Multimedia System and Associated Methods," which is a continuation-in-part of U.S. patent application Ser. No. 13/353,283 filed on Jan. 18, 2012, entitled" Multimedia, Multiuser System and Associated Methods," which is a continuation-in-part of U.S. patent application Ser. No. 12/650,684 filed on Dec. 31, 2009, entitled" Multimedia, Multiuser System and Associated Methods," now U.S. Pat. No. 8,600,816 issued on Dec. 3, 2013, which is a continuation-in-part of U.S. patent application Ser. No. 12/588,774 filed on Oct. 27, 2009, entitled" Multimedia, Multiuser System and Associated Methods," now abandoned, which is a continuation-in-part of U.S. patent application Ser. No. 12/222,670, filed on Aug. 13, 2008, entitled "Multimedia Restaurant System, Booth and Associated Methods," now U.S. Pat. No. 8,583,491 issued Nov. 12, 2013, all of which are hereby incorporated by reference in their entirety for all purposes.

BACKGROUND

1. Field

Embodiments are directed to a multimedia system in which activity regarding interaction with files within a session may be monitored and to a multimedia system in which the same media file may be selected to be viewed on a display from a number of mobile devices.

2. Description of the Related Art

Currently, people may connect mobile devices to projectors using connectors that directly plug devices into the projector. For connecting more than one device, a switch is often used to change which signal is sent to the projector. One method used with a switch is to have mechanical buttons placed on the table to change the settings on the switch to change which mobile device is connected to each projector. Another option is the use of a disk that sits on top of the table and can be moved around. One disk is used for each mobile device to be connected. Each disk contains a hardwired connection to a switch and a button is located on top of the disk. However, the use of these disks adds clutter to the table as well as additional cost. The additional hardware and expense comes with very little increase in functionality. If additional hardware and cost is to be added to a conventional conference room table it is desirable if the hardware were to have more functionality in addition to that of just switching the devices displayed on the projector. Further, such a switch only allows content from one mobile device to be displayed on each screen at a time.

In addition, with current mobile devices, in some cases wireless connections are preferred over wired connections. Mobile devices may be connected to a projector on a same network. Such connection requiring software to be downloaded and installed on the mobile device. This software then digitizes the output of the device and sends it wirelessly to the projector. The projector then stores the digitized video signals from the mobile devices. The projector then combines these signals and displays them However, current wireless connections have numerous disadvantages, e.g., are non-intuitive, require time for installation of software, and compatibility issues with various operating systems. Thus, wireless connections have not received as much success in the market place as the basic switch and the disk method described above for multiple user applications.

Further, in certain conditions in which the wireless connection may not be highly reliable, e.g., under high traffic conditions, transferring a lot of data wirelessly to a display may not be efficacious.

SUMMARY

One or more embodiments are directed to a system including a surface having a touch screen display, a computer connected to the touch screen display, and a login window displayed on the display, the display computer receiving identifying information from the user via the login window, once a user logs in through the login window, the display computer starting a session and displaying icons, the display computer collecting information regarding activity during the session, associating the activities of the session with that user, and, once the session ends, the display computer generating a report based for each user and activities associated with each user.

The login window may allow the user to login as a guest, for which guest is provided as the indentifying information is provided.

The login window may include a scan button that associates scanned data as the identifying information.

The touch screen display may be a continuous touch screen display and the computer may be configured to reconfigure the display from an initial configuration into a different configuration includes a corresponding to a numerical value, a numerical value of one corresponding to a single screen and a numerical value of greater than one corresponding to a number of independent sub-screens equal to the numerical value, the user being able to change the numerical value, and provide a login window in each sub-screen.

Each login window may receive identifying information from a corresponding user.

Each login window may include a scan button and, in response to selection of a scan button in a login window in a sub-screen, the computer associates scanned data as the identifying information for that sub-screen Scanned data may be input to a first number of sub-screens from a second number of scanners, wherein the first number may be greater than or equal to the second number.

The computer may be configured to separately collect information regarding activity within each sub-screen during the session.

The computer may be configured to, when a number of sub-screens selected is less than a number of active sessions, prompt each user in a sub-screen to end the session.

Entering identifying information in one sub-screen does not affect activities in other sub-screens.

One or more embodiments are directed to a system including a large format display, a display computer storing a plurality of files to be displayed on the display, and a mobile device application loaded onto a mobile device, the mobile device application storing the plurality of files on the mobile device, wherein, when the mobile device and the display computer are connected, a file selected on the mobile device within the mobile device application is displayed on display by sending a file identifier from the mobile device to the display computer.

The mobile device application may be configured select from more than one large format display.

When the user of the mobile device is selecting from media files of the plurality of files, a screen for selection of a media file may display previous and upcoming images of media files to be selected from, with an image of a current media file to be selected from being larger than and central to previous and upcoming images.

When the user of the mobile device is selecting from document files of the plurality of files, some document files may be fully loaded on a screen for selection of a document files before other document files appear on the screen.

The mobile device application may further include at least one of a social connect function, a whiteboard function, and a camera function.

Activity on the additional functions on the mobile device is associated with activity on the large format touch screen.

When the display is a continuous touch screen display operating in a multi-user mode, a user of the mobile device application selects which sub-screen the mobile device is to be connected to.

The plurality of files stored on the display computer and the mobile device may have a same organizational structure.

Displays available to connect to the mobile device may be connected to the mobile device by a wireless network or may be determined by a relative position of the mobile device and the displays.

BRIEF DESCRIPTION OF THE DRAWINGS

FIG. 24 is a screen shot of a home screen of the mobile device; and

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

As used herein, "table display" is to refer to a monitor or television mounted horizontally and size to have at least two user stations, and "wall display" is to refer to a monitor or television mounted vertically, or at any other convenient position for viewing at the proper orientation by users at the stations of the table.

It is desirable for multiple users at a table and share information on their mobile devices. The mobile devices may be: lap top computers, smart phones or tablet computers. The information that may be shared includes photos, videos and whatever content is on the display screen of one of these mobile devices.

It is also desirable for the users at the table to be able to view the content from multiple devices on the table display and the wall display at the same time and have the ability to change which devices are displayed in real time with an easy intuitive control mechanism.

It is also desirable to do all of the above without requiring users to download software that may take a long time to download or may contain viruses.

It is further desirable to implement the above in a secure manner, so that users that are not at the table cannot push content to the wall display unless they are authorized.

It is also desirable to provide a fixed computer associated with the table, such that the table may be used even without mobile devices and instructions for using the table may be readily provided.

It is also desirable to divide the table display into multiple screens, e.g., so that users at various stations may separately and simultaneously control content displayed.

Figure 1:
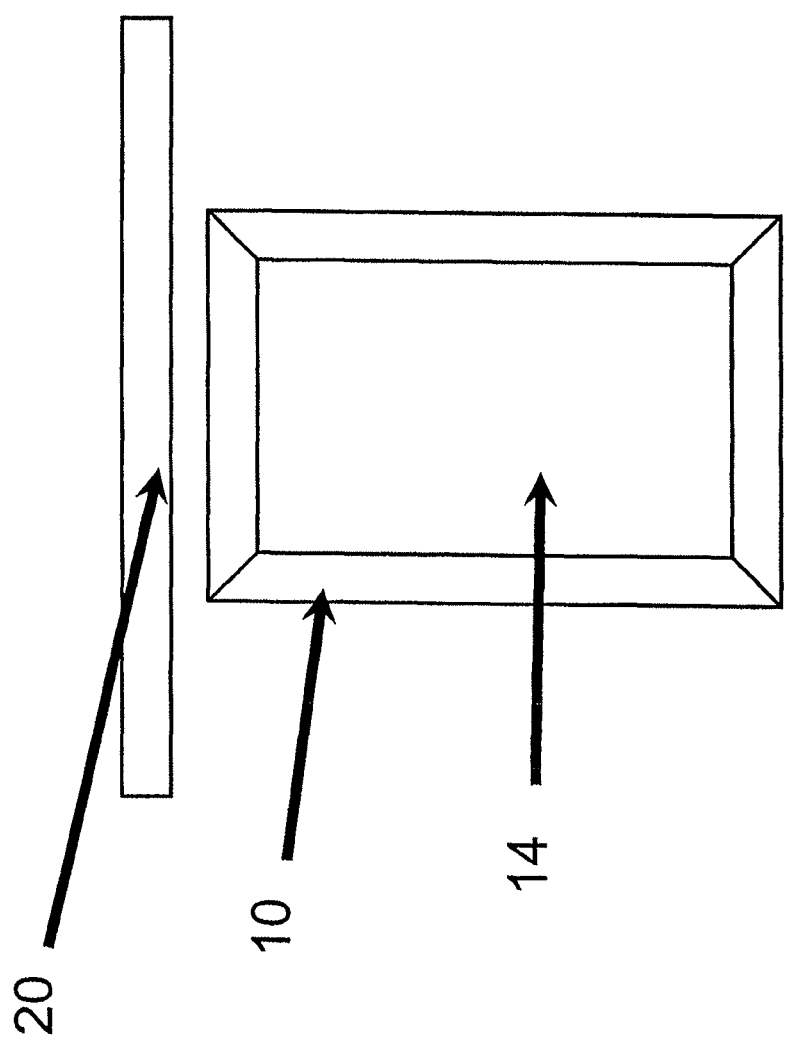
FIG. 1 illustrates a top down schematic view of an embodiment.
Figure 3:
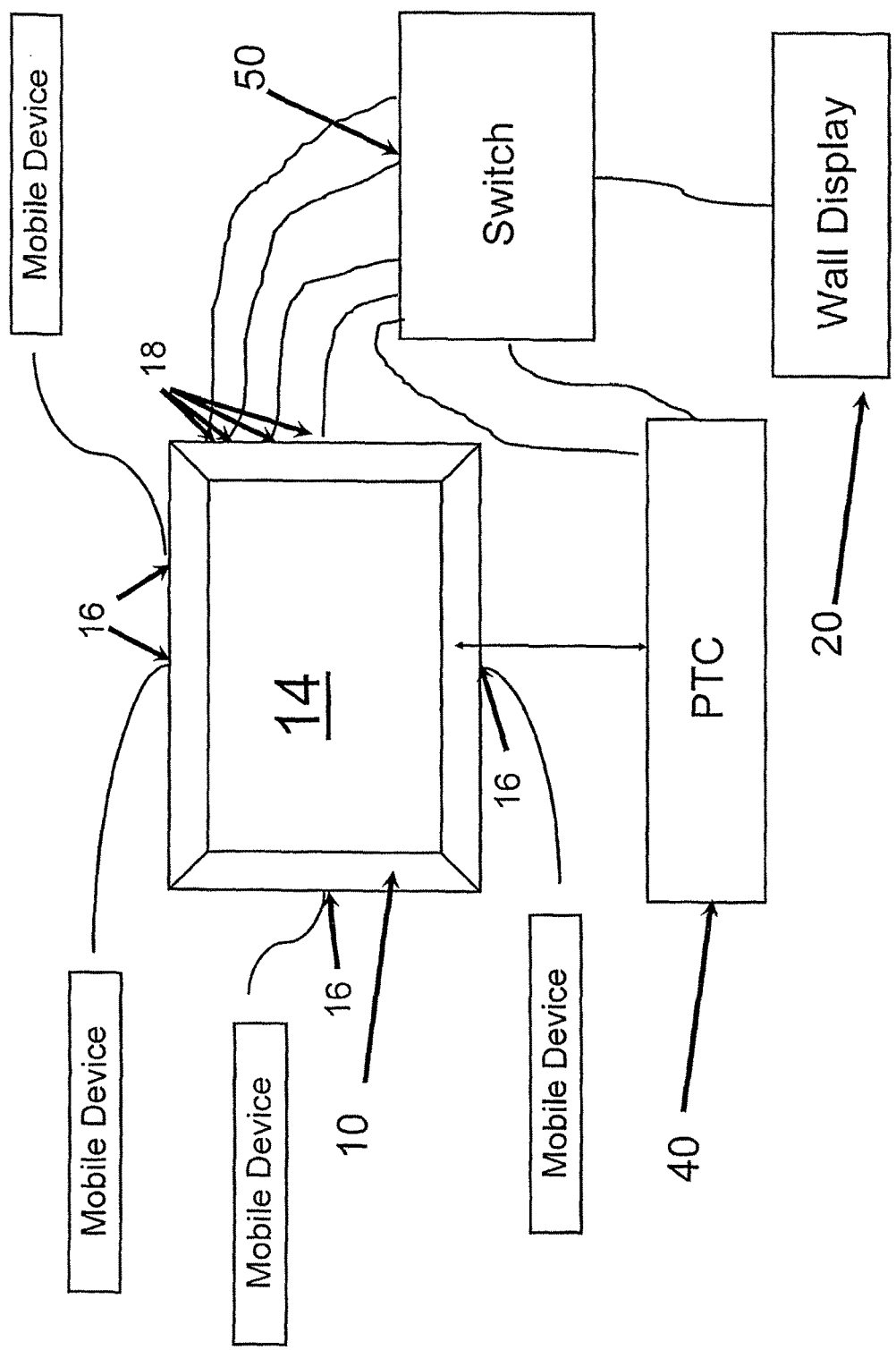
FIG. 3 illustrates a block diagram of a network according to an embodiment.

FIG. 1 illustrates a top down view of an embodiment including a touch screen 14, i.e., a table display, in a table 10 in addition to a wall display 20. FIG. 3 illustrates a top down view of another embodiment including the touch screen 14, i.e., a table display, in a table 10 and two wall displays 30.

Figure 2:
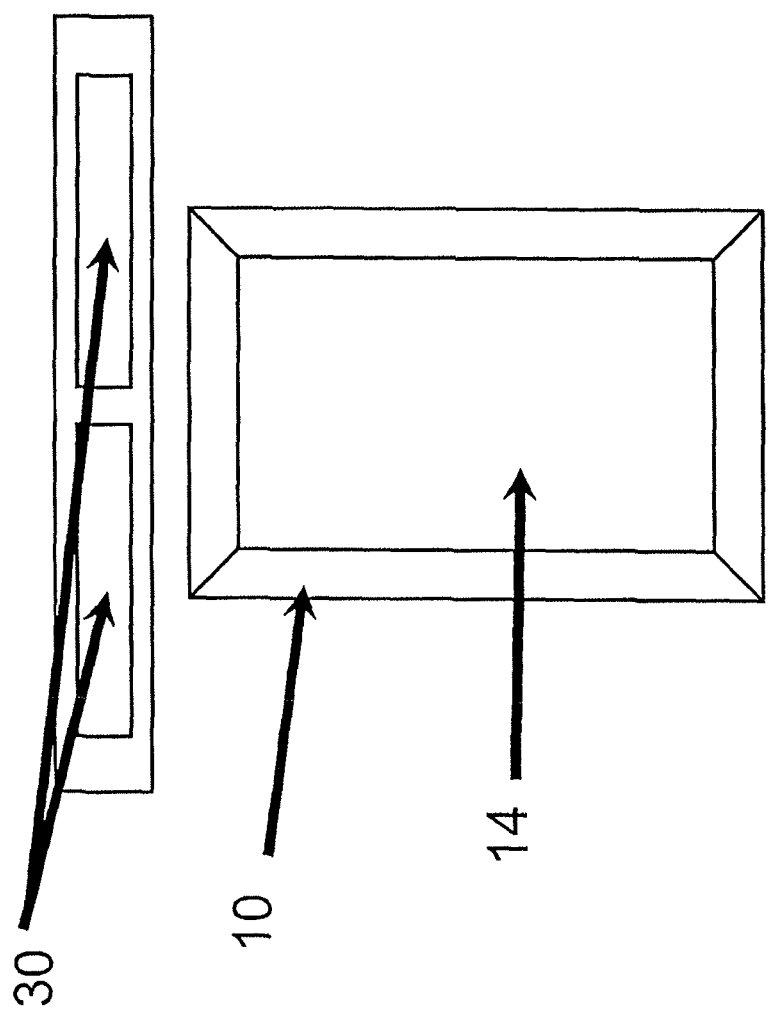
FIG. 2 illustrates a top down schematic view of another embodiment.
Figure 4:
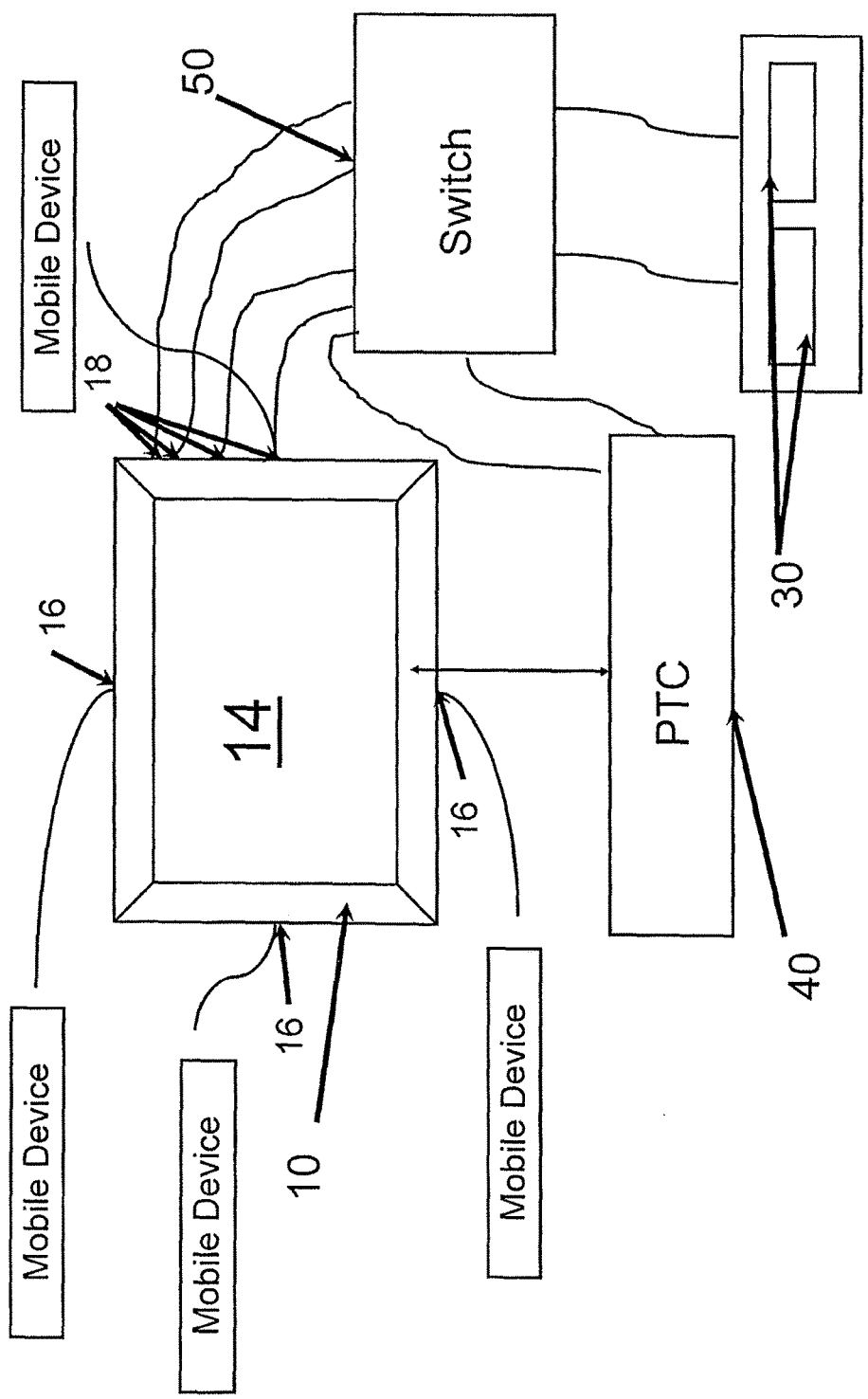
FIG. 4 illustrates a block diagram of a network according to an embodiment.
Figure 5:
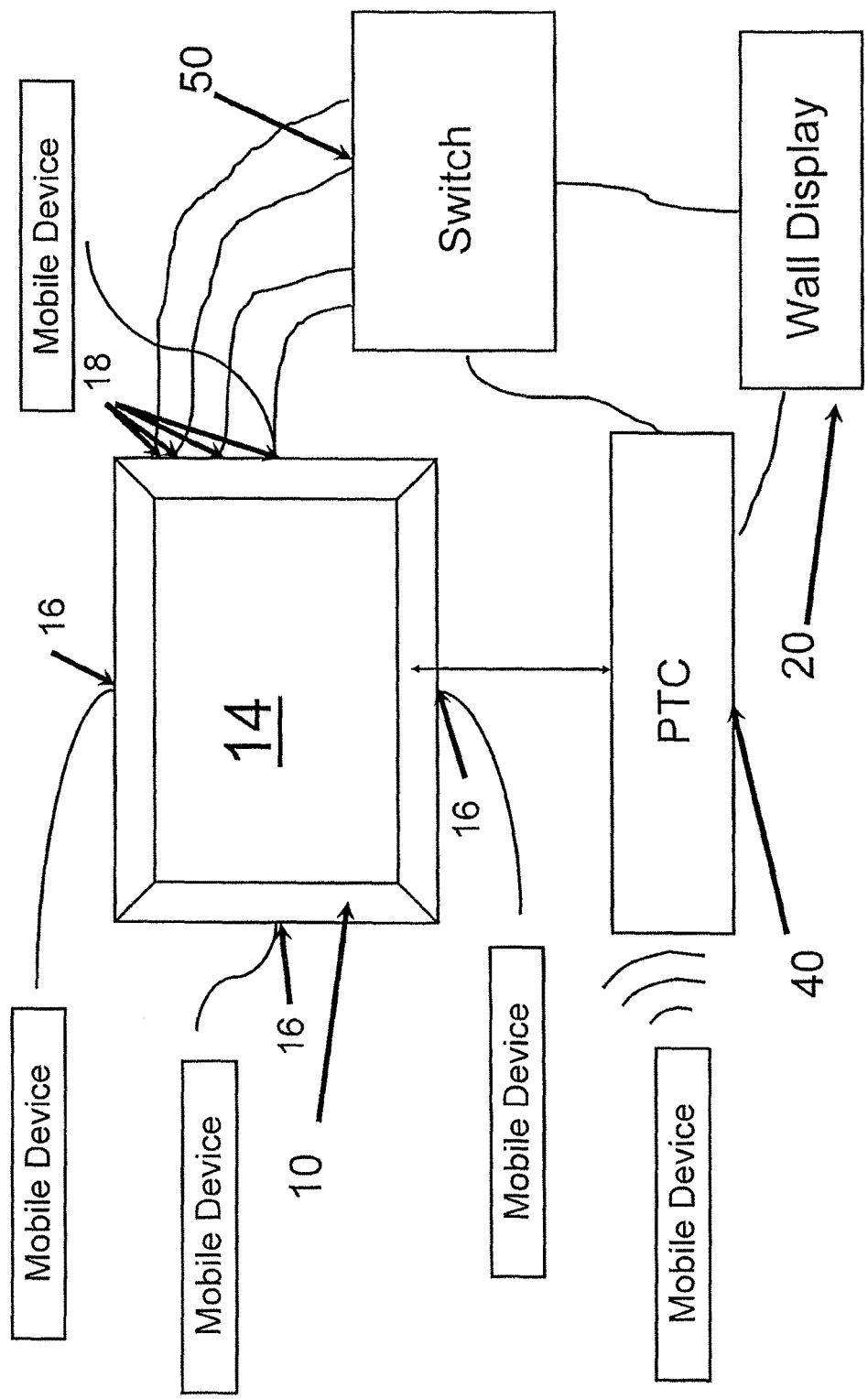
FIG. 5 illustrates a block diagram of a network according to an embodiment.

FIGS. 3 to 5 illustrate block diagrams of a network for use with the configurations of FIGS. 1 and 2 according to an embodiment. These block diagrams merely to illustrate connections between components and the placement of the components therein is not representative. Also, either wall display 20, 30 may be using in the configurations illustrated below.

As illustrated in FIG. 3, the touch screen 14 of the table 10 may cover most of the area of the table. A processor 40 connected to all associated displays, e.g., the touch screen 14 and the wall display 20, is referred to as the Primary Table Computer ("PTC") 40. The PTC 40 may be connected to a network, e.g., by ethernet. The network may contain a wireless router. Other devices in addition to the PTC 40 may be on this network.

A switch 50, e.g., a 5-port vga switch, may also be located in the vicinity of the table 10. In particular, the table 10 may include inputs 16 and outputs 18 for connecting mobile devices to the switch 50. This switch 50 may be controlled by the PTC 40. In this manner, any mobile device, e.g., up to four mobile devices, may have content displayed on the Wall Display 20. Additionally, the PTC 40 may provide a video output to the switch 50, as well as a control signal. Further, under control of the PTC 40 to be discussed in detail later, content from one or more of the mobile devices may be displayed on the touchscreen 14. Using the switch 50 to provide all video signals to the wall display 20 may assist in making the touchscreen 14 and PTC 40 more readily integrated with a generic wall display.

In addition, the PTC 40 may run a software program (herein, "the TTMenu") as disclosed co-pending, commonly owned U.S. patent application Ser. Nos. 12/222,670, 12/588, 774, and 12/650,684, the entire contents of all of which are hereby incorporated by reference for all purpose.

When no mobile devices are connected to the switch 50, the wall display 20 and the table display 14 may show images generated by the PTC 40. For example, the PTC 40 may initially provide images explaining instructions for connecting mobile devices or other information.

In this manner, the table 10 can be configured to have multiple mobile device inputs 16 having outputs 18 connected to inputs of the switch 50. Multiple users may come to the table 10 and connect their mobile devices to mobile device connection 16 at the table 10. By hitting buttons on the touch screen 14, the content of the wall display and/or the touch screen 14 may be switched between the PTC 40 and any one of the multiple mobile devices connected to the inputs 16.

As illustrated in FIG. 4, when the wall display 30 is used, two outputs may be provided from the switch 50, here configured as a 5×2 switch, i.e., a video output for each wall display 30.

As illustrated in FIG. 5, the video output from the PTC 40 may be directly connected to the wall display 20, instead of through the switch 50. In other words, two input channels may be provided to the wall display 20, e.g., a PC input and an hdmi input. The hdmi input comes from the PTC 40. The PC input will come through the switch 50 from mobile devices connected to the switch 50. When no mobile device is connected to the switch 50, the wall display 20 may display the input connected to its hdmi input, displaying the content of the PTC 40 under control of the PTC 40, either through an IR signal or the ethernet. In this case the switch 50 may not be used.

When the switch 50 is not being used in the embodiment of FIG. 5 or when the PTC 40 is to be displayed in the embodiments of FIGS. 3 and 4, the wall display 20 and the table display 14 may show images generated by the PTC 40. For example, the PTC 40 may initially provide images explaining instructions for connecting mobile devices or other information.

Further, as illustrated in FIG. 5, in accordance with an embodiment, the mobile devices may also be connected to the PTC 40 wirelessly. For example, operating systems of many new mobile devices have streaming or content sharing built in which may be employed for control of content displayed. For example, the iOS 5 for the iphone® and ipad® by Apple® has a built in function called Airplay®. Airplay® streams still images and/or audio/video and/or screen shares to Apple's Apple® TV product.

Typically, streaming from a mobile device only allows a single image or series of images to be displayed on another display. By using a table display application (TDA), discussed further below, a user may display the entire display on their mobile device or may upload particular folders/files onto the PTC 40.

In accordance with an embodiment, when a user connects a mobile device to the same network as the PTC 40, they can attempt to use a video streaming or content sharing application that is built in to the operating system of their mobile device. For example, for an Apple® mobile device, they could attempt to use Airplay®. When they do this, they will be shown a list of all AppleTV®s connected to this network. By configuring the PTC 40 to emulate a streaming video receiver, e.g., an AppleTV, and to have a specific device name, a user connected to the wireless network will see the specific device name associated with the PTC 40 listed. The PTC 40 may broadcast what services it supports, in addition to the specific device name. Once a user selects the specific device name on their mobile device, the user can be connected to the PTC 40.

If an actual streaming video receiver was employed instead of the PTC 40 emulating the streaming video receiver, then when a second mobile device attempted to connect to the video receiver when a first mobile device was already connected, the first mobile device would be disconnected and the content from the second mobile device would be displayed. For the first mobile device to connect again, the video receiver would need to be reselected, and the second mobile device would then be disconnected.

However, by simulating a video receiver in software, multiple devices may be connected at the same time. Each device can be displayed on the touchscreen 14 and by dragging icons representing the mobile devices displayed on the touchscreen 14 towards the wall display 20, which mobile device's content is displayed thereon may be changed, without having to reconnect.

Before displaying information from the user's device on the touchscreen 14 and/or the wall display 20, whether the used is authorized may be determined. For example, in a public environment, it may be undesirable to allow users that are not seated at the table 10 to send content to the table display 14 or wall display 20. In order to authorize the user, there are several security options that can be employed, as illustrated generically in the flowchart of FIG. 6.

Figure 6:
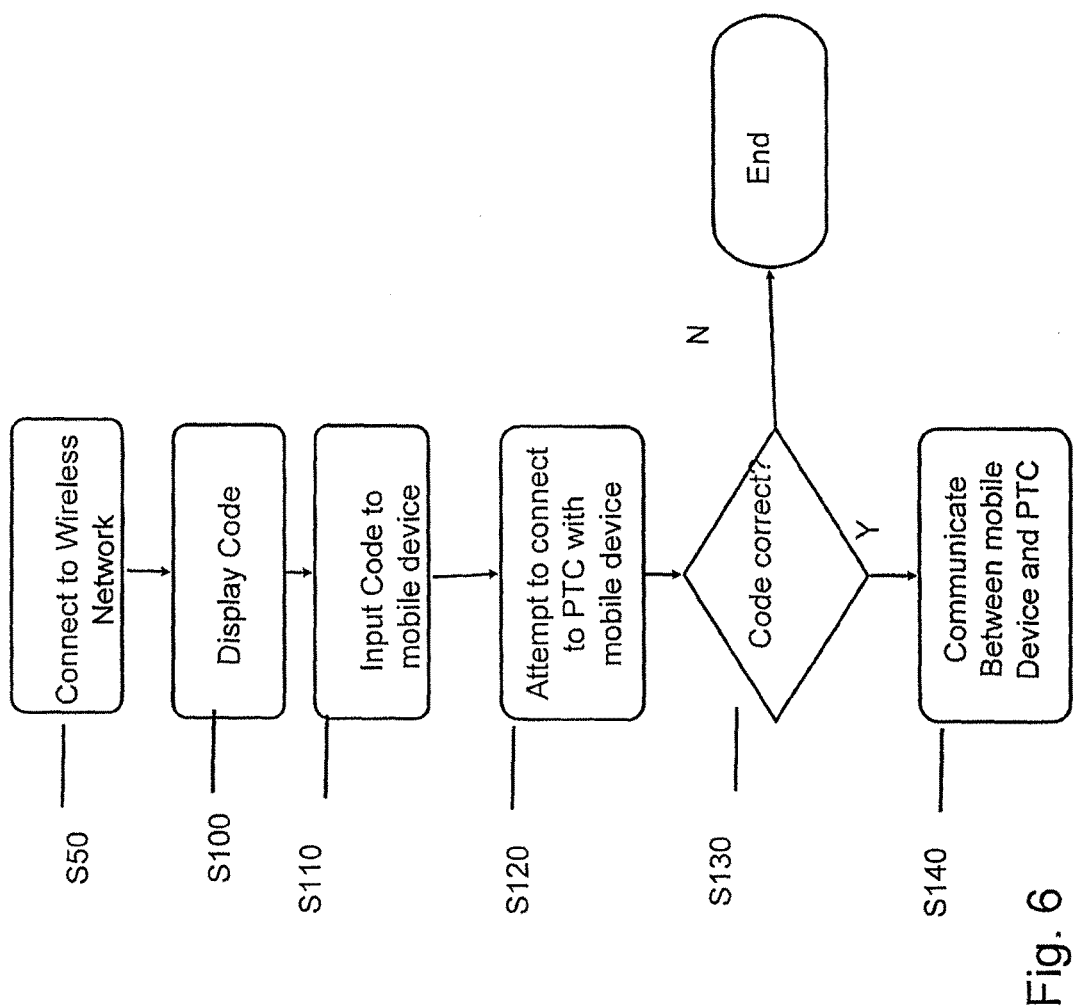
FIG. 6 illustrates a flowchart for securing a wireless connection according to an embodiment.

As illustrated in FIG. 6, in operation S50, first the mobile device connects to a wireless network having the PTC 40 thereon. In operation S100, a code may be displayed, i.e., on either the wall display 20, 30 or the table display 14, by the PTC 40. Depending on how the displays are mounted, it may be more secure to display the code on the table display 14, since the table display will typically be less visible to users that are not seated at the table.

In operation S110, the code is input to the mobile device. This input may be achieved manually, may use the mobile device's camera, may use another application already on the mobile device, and/or may require a table display application, as will be described in detail below.

In operation S120, the mobile device attempts to connect to the PTC 40. In operation S130, the PTC 40 determines whether the code provided by the mobile display is correct. If not, the process ends. If the code is correct, communication between the mobile device and the PTC 40 commences in operation S140, typically using the streaming capability of the mobile device. Streaming video techniques that are built in to operating systems are designed to work with low cost set-top boxes. For example, Airplay® is built in to the operating systems of most Apple® products and is designed to work with AppleTV®.

In contrast, in conventional systems using Airplay®, initially the AppleTV® is set up, typically with a remote control. During the set-up process the user can enter a password for Airplay® connections. This password is typically not changed very frequently as it requires the use of a remote control and selecting options on a keyboard with a remote control. When a mobile device is connected to the same network as an AppleTV®, a user of the mobile device is provide with a list of the AppleTV®s on the network. If the AppleTV® had a password entered during the set-up process, the user is required to enter the password, which is not displayed at this time. Once the correct password is entered then the AppleTV® changes its full video output signal from internal video to the video that is streamed from the mobile device. In this manner, the content of the user's mobile device is displayed.

In contrast, by emulating a receiver, in operation S100, the PTC 40 may constantly display and update the code or may display the code in response to a request input via the touch screen 14. The code may be a password, a bar code such as a QR code, or a visual code created by the PTC 40 in response to placement of a mobile device on the table 10.

Figure 7A:
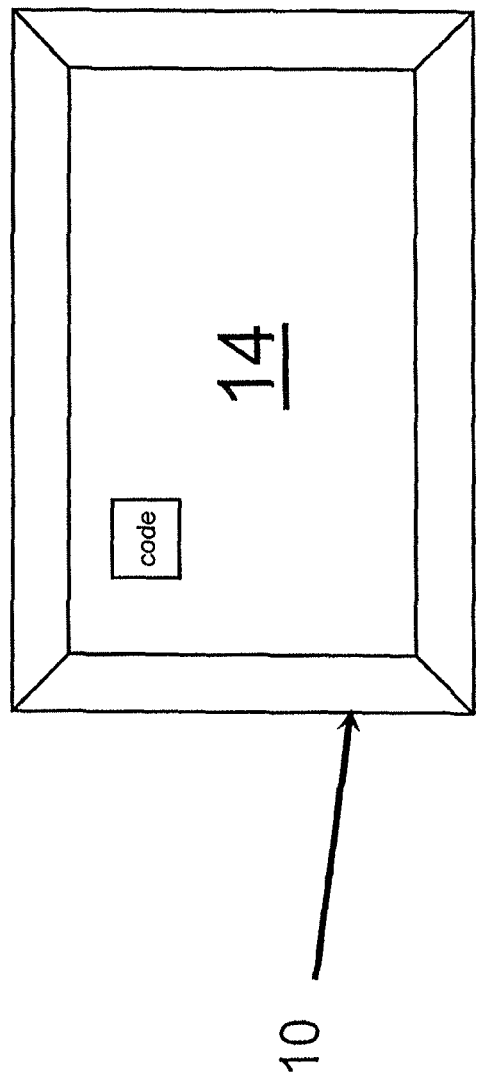
FIGS. 7A and 7B illustrate a top schematic view of a table display providing a code to a mobile device according to embodiments.

FIG. 7A illustrates a configuration for a code requiring space between the mobile device and display of the code. For example, if a password is used, the mobile device cannot cover the password. Once a password is displayed, the user can enter the password on their mobile device. The PTC 40 can be designed to periodically change the password for each user and store the password locally ensuring that the user is actually sitting at the table. This approach is the simplest and does not require anything to be downloaded onto the mobile device.

In streaming video or content sharing applications that are in operating systems of mobile devices, such as Apple's Airplay® mirroring, once the application is chosen and the particular computer, i.e., the PTC 40, is selected there is an option for the user to select a password associated with the PTC 40. For an AppleTV® and for devices that are typically designed to work with Airplay® mirroring and similar applications, this password is typically chosen at set-up and is not changed frequently, since it is not easy to change this password. However, in this embodiment, since the PTC 40 is emulating an AppleTV® or other streaming video receiver, the password for the streaming video application may be changed rather easily and therefore may be frequently changed, e.g., many times per day.

In this embodiment, the PTC 40 is reset periodically, e.g., after inactivity or when a new session is started, when new users sit at the table. When this happens, the PTC 40 will reset the streaming video password, assuring a secure connection and preventing previous users that are no longer sitting at the table from connecting to the PTC 40. Further, content associated with a previous session may be deleted.

Another option for obtaining a code in operation S100 is use of a bar code, e.g., a quick response (QR) code. When a QR code is displayed on the table display 14, as illustrated in FIG. 7A, a camera in the mobile device can take a picture of the QR code. Reader applications for QR codes are ubiquitous. The QR code detected by the reader application on the mobile device then directs the user to a specified website. In particular, each QR code could be unique to each table, to each request, and/or each session. Each unique QR code would take the user to a different web address. Every time a new QR code is read, the mobile device would be directed to a unique URL address which can act as a key (embedded password) for the PTC 40. Then, when the PTC 40 detects a device trying to access it, with the correct key, the PTC 40 determines that the device just received the QR code. This website could obtain a key from the mobile device. Then, the PTC 40 can note a particular characteristic of the mobile device, e.g., a MAC address, an IP address, a device name, and so forth. Once this happens, the PTC 40 can instruct the user to share information with the table system. The user can then follow the instructions to share content with the PTC 40. Content may be shared using built in features of the operating systems of the mobile device, e.g., Airplay® with iOS. When the user tries to stream information to the PTC 40, the PTC 40 will check the MAC address or ip address of the mobile device to make sure it is valid. If so, the PTC may then allow content to be shared.

Another alternative when using a bar code or QR code is to use a table display application (TDA) downloaded onto the mobile device. The TDA is different than applications noted above in the related art, since the TDA will not digitize the mobile device's video output and stream it. Instead, this application will utilize the streaming function built in to the operating system. By using the TDA, security can be very robust and not be dependent on an operating system of a particular mobile device. The QR code could automatically direct the user to a website that would ask whether the user wants to download the TDA. Alternatively, instructions, including a website from which the TDA can be downloaded, could be displayed, e.g., on the touchscreen 14. Once the TDA is downloaded or otherwise on the mobile device, a QR code would be displayed again, either the same or a new QR code, to obtain the key information.

Figure 7B:
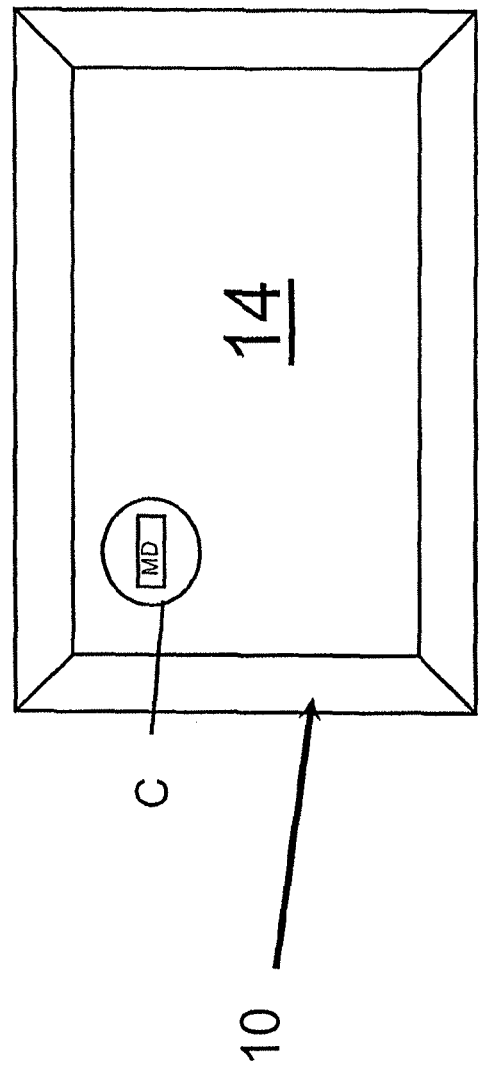

Another alternative to connect wirelessly using the TDA is illustrated in FIG. 7B. Here, the mobile device may be placed on the touchscreen 14, with a camera therein facing the touchscreen. A user may request connection by interacting with the touchscreen 14, e.g., by drawing a circle C around the mobile device or by placing the mobile device within a region indicated on the touchscreen 14. Alternatively, the touchscreen 14 may automatically detect the presence of the mobile device. The table display 14 may display a time sequential code, e.g., a series of colors, within the circle. The mobile device detects the code and then tries to connect to the PTC 40 using the code.

Using this contact embodiment may simplify determination of where the content came from when multiple devices are supplying content, as well as simpler detection when the mobile device is removed. Once the mobile device is removed from the table, pictures/data associated with that device can also be removed instantly or after a delay, either predetermined or user selected.

Multiple Mobile Devices Connected to a Single Computer

With some operating systems, e.g., the current operating systems of Apple® products, only one mobile device at a time can be connected to each receiver. So, if the PTC 40 only emulates a single receiver, only content from one mobile device can be displayed at a time. As soon as another mobile device is connected, then the content from the former device is no longer displayed, i.e., is replaced with the content of the latest device to connect.

According to embodiments, instead of using set-top boxes, the PTC 40 is configured to receive the signal from the mobile device(s). The PTC 40 may also combine the signals and reformat them. The PTC 40 can be configured to simulate a set-top box, so that it can receive signals from streaming video or content from mobile devices. When the first mobile device is connected to the same network as the PTC 40, the first user can "connect" their device with the security measures and procedures described above.

When subsequent mobile devices are connected each mobile device can be assigned a different thread by the PTC 40. Then the PTC 40 can send content from any one of the mobile devices wirelessly connected to it, to the wall display 20, 30, thereby emulating a simple switch, or the PTC 40 may combine multiple video streams together, resample the video stream, and send the resampled stream to the wall display 20, 30.

For example, if four Ipads® are connected wirelessly to the PTC 40, each with 1080 p resolution, the PTC can down sample the video signals to ½ the resolution in each direction. Then, the PTC can combine the four video signals forming a full 1080 p video signal with four quadrants and the contents of one mobile device video stream in each of the four quadrants. In this manner, the wall display 20, 30 may be effectively divided in to four quadrants, with each quadrant displaying the video content of a different mobile device.

Multiple Table Environment

One option for wireless connections in an environment having multiple tables includes having a unique wi-fi hot spot for each table 10. In many cases, each PTC 40 will have wi-fi capability. Each PTC 40 can be configured to be its own wi-fi hot spot. While this option is simple and low cost, security and ease of use are compromised.

When using unique wi-fi hot spots for each PTC 40, when the instructions are displayed at the table 10, the user will be instructed to connect to a specific wi-fi network. For example, if twenty tables are in range of the mobile device, twenty different wi-fi networks may be displayed each labeled 1 through 20. If the user is seated at table 12, the instructions may instruct the user to connect to the wireless network called "Table 12." Once connected to the network, the user can scan a code as described above and will then be instructed to play a slideshow or video on their device. Once they play the slideshow or video, they will then get a prompt on their device to select the name of the PTC 40 for "Table 12". In other words, the selection of the table must be performed twice.

Alternatively a single wireless router can be used for many tables. This simplifies the user connection, in that they will not see as many wireless routers when they try to connect to the network and selection only needs to be performed once.

For example, when using the QR code, the user would be instructed to connect to the wireless network named, for example, Tables 1-10. An instruction may then be displayed, e.g., "Start the TDA on your mobile device or scan the QR code below to obtain the app and press the button here once it is downloaded and you have started the TDA on your mobile device." Once read, the QR code would start a download to your mobile device and the website the QR code directs to is associated with the appropriate PTC 40. Once the TDA is running, the QR code would be need to be scanned again to send the correct information to the PTC 40.

Also, the TDA may be used with either multiple or single wireless access points to facilitate additional security, e.g., a firewall, such as a vpn, between the wireless access points and each PTO 40.

Hard Wired vs. Wireless Connections

With a wireless connection via a digital streaming video function, the PTC 40 receives a digital video signal so that it can sample the video stream, combines the sampled video signal with other videos and display it on the Table Display or the Wall Display. However, if a mobile device is connected with a typical continuous video adaptor such as a VGA connector, then a continuous video display would be transmitted to the PTC 40. In this case in order to implement many of the functions in the embodiments, the PTC 40 would need to digitize the input from the VGA adaptor or other similar video connector. If more than one mobile device were to be connected at the same time, then the PTC 40 would be required to simultaneously digitize multiple video streams. This is difficult for a single computer along with the other functions required.

In order to combine multiple video streams as combined above, the video streams may be digitized prior to transmission to the PTC 40. This can be achieved, for example, by having each mobile device digitize its video output and stream it to the table computer as in the case of a streaming application such as Airplay® described previously.

However, some mobile devices may not have a streaming video application integrated in to its operating system. In this case, in order to convert the continuous video signal to a digital streaming video, a digital scaler box may be used.

Figure 8:
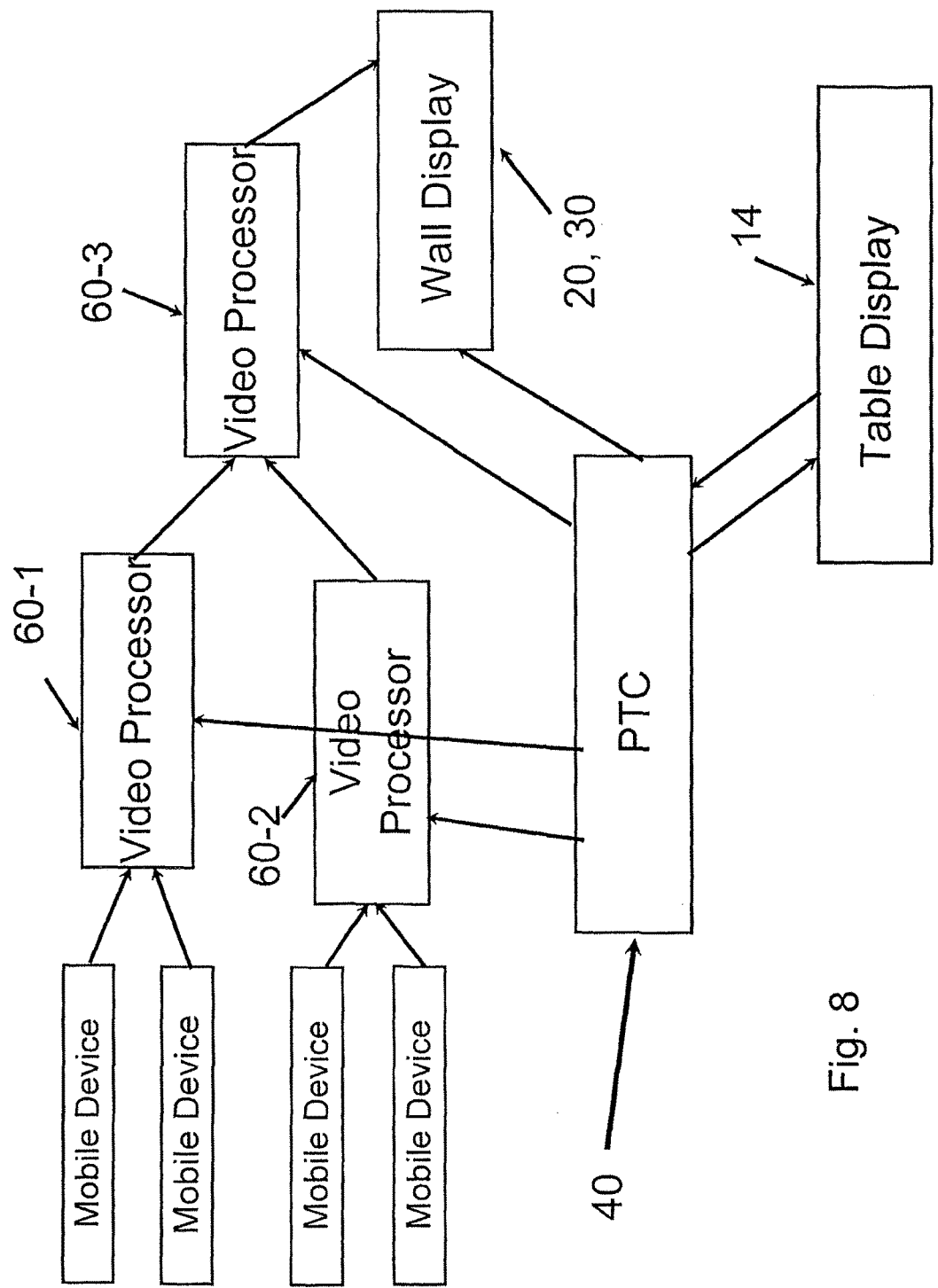
FIG. 8 illustrates a block diagram of a network according to an embodiment.

For example, an example of a video processor is a 1T-C2-750 scaler processor made by TV One. This processor can superimpose two inputs onto one output. For example, video processors 60-1 to 60-3 may be cascaded as shown in FIG. 8, so that four video signal inputs may be superimposed on a single output video signal. This processor has dvi inputs and outputs. A dvi to hdmi converter cable can be used to provide an hdmi signal to the wall display 20, 30. VGA to dvi converter cables may be used to connect the mobile devices to the processors 60-1 to 60-3.

The processors 60-1 to 60-3 may be configured by rs-232 or IR controls. Therefore, the processors 60-1 to 60-3 may be electronically configured to accept each of its four inputs as 1920×1080 signals or other tv or pc 2-d video signals.

In this manner, the processors 60-1 to 60-3 may be configured to scale each of the input signals by a factor of 0.5 in each direction and superimpose each of these one on one quadrant of the output signal. This will result in an output signal composed of the four input signals, one in each quadrant. When this signal is sent to the wall display 20, 30, all four signals may be displayed on the wall display 20, 30 simultaneously.

In one embodiment, multiple video processors 60-1 to 60-3 may be integrated in to a table. Digitized video signals are input to the PTC 40. The video signals may be digitized either by the mobile device from which they originated (e.g. a streaming video application) or by a video digitizer.

In this manner, multiple mobile device displays can be combined and displayed on the table display 14 or the wall display 20, 30, where some mobile devices are connected wirelessly and some through wired adaptors, including analog video adaptors, such as vga connectors.

Video Conferencing

Figure 9:
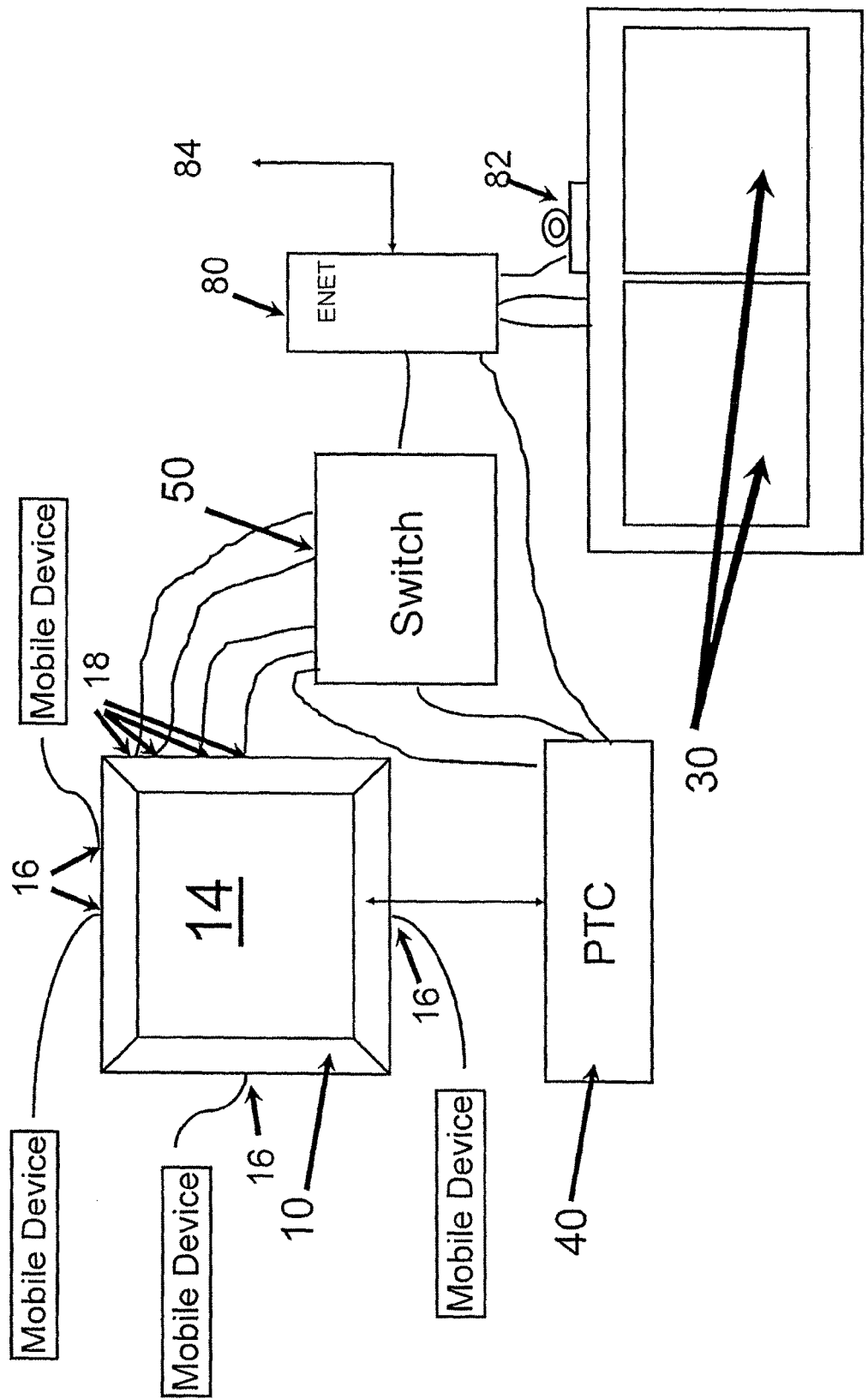
FIG. 9 illustrates a block diagram of a network according to an embodiment.

As illustrated in FIG. 9, video conferencing capabilities may be readily incorporated into the system in accordance with embodiments, by providing, for example, a video conferencing processor 80 and a camera 82. The video conferencing processor 80 may be connected to the switch 50, the wall display 30 (or 20), the camera 82, and a remote feed 84. The camera 82 may be positioned on the wall display 30. The PTC 40 may also control the video conferencing processor 80 and control what is displayed on the wall display 30. For example, one of the wall display 30 may display content being discussed, while the other wall display 30 may display an image from the remote feed.

Use of the Touch Screen

Figure 10A:
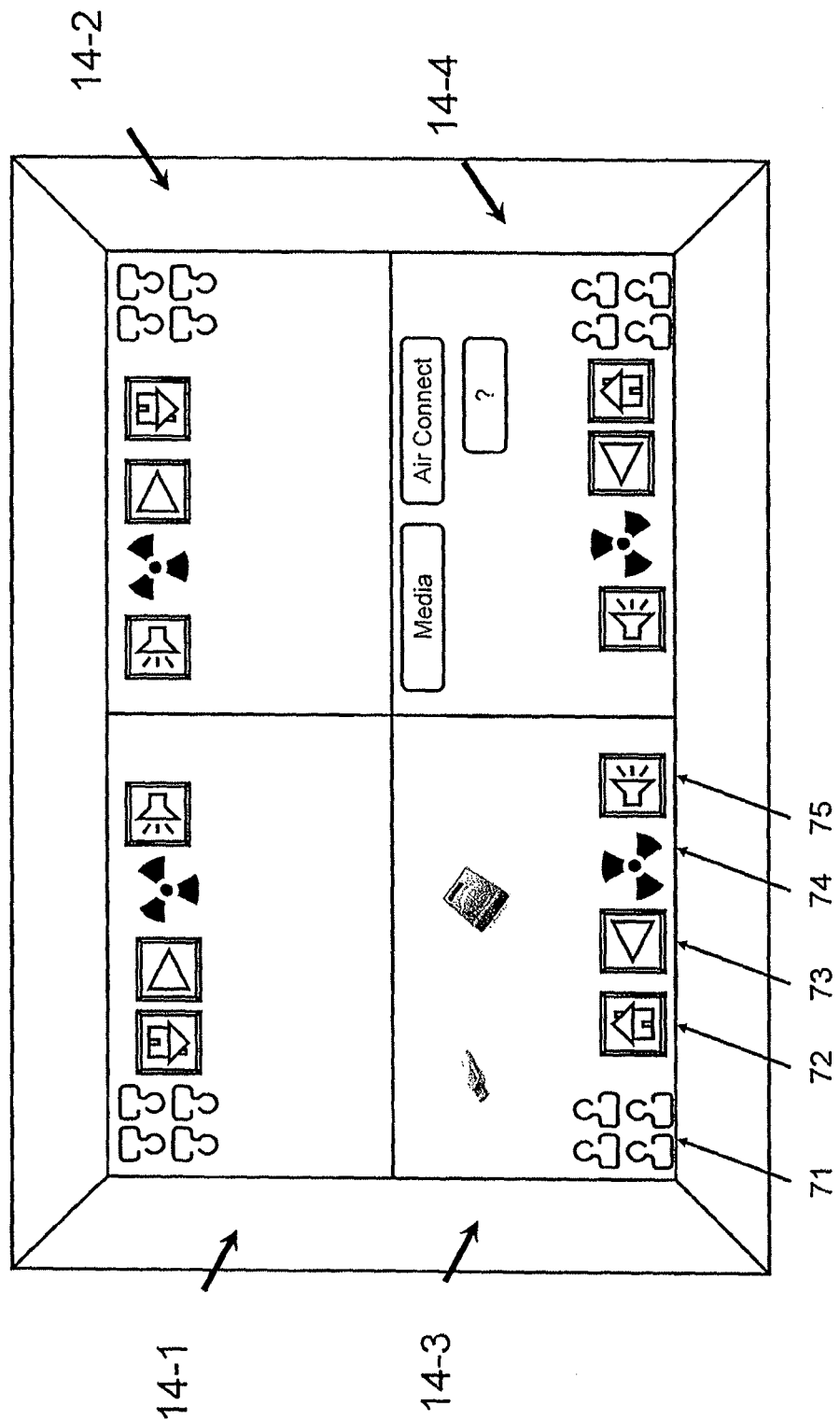
FIGS. 10A to 10D illustrate schematic top views of different stages of use of a table display according to an embodiment.

In any of the embodiments above, control of the wall display 20, 30 and the table display 14 may be provided through the use of the touch screen in the table 10. Certain icons may be displayed at all times on the touch screen, regardless of what else is displayed thereon, e.g., may be to the side of or superimposed on content being displayed. For example, as illustrated in FIG. 10A, the touch screen 14 may always display core icons, e.g., a screen number icon 71, a home icon 72, a back icon 73, a session end icon 74, and a volume icon 75. When the touch screen includes multiple display sections, e.g., four sections 14-1 to 14-4 as illustrated in FIG. 10A, each section may display these core icons at all times.

When the home icon 72 is selected, then additional options may appear, as illustrated in section 14-4 in FIG. 10A. For example, a media button, an air connect button, and a "?" button may appear. Selecting the air connect button may begin the wireless connection process noted above. Selecting the "?" may display answers to frequently asked questions and further help issues. Selecting the media button may result in the display shown in section 14-3 of FIG. 10A. In section 14-3 of FIG. 10A, a user is presented with the option of selecting content stored in media connected via a USB port or locally on a mobile device.

Figure 10B:
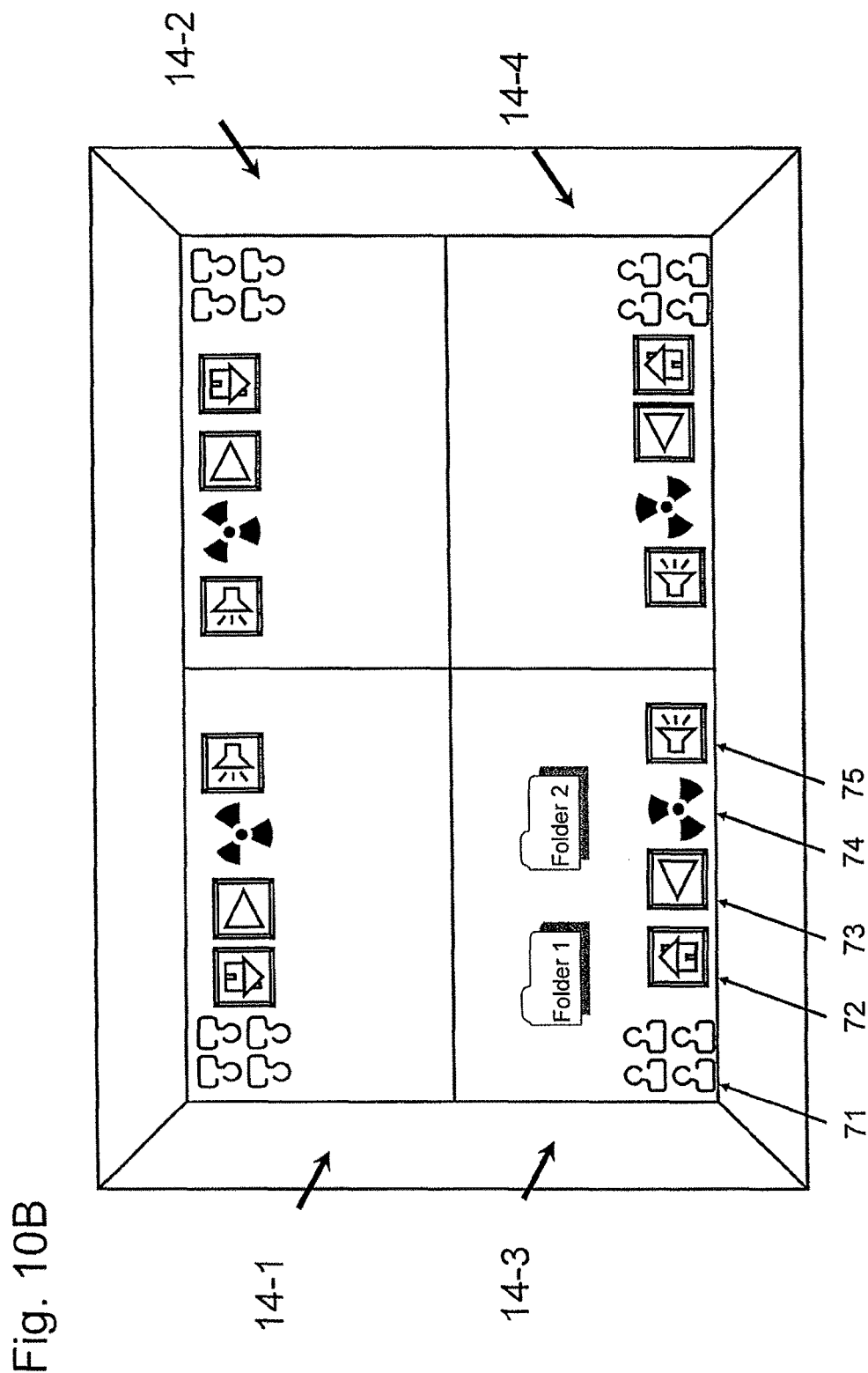

Selecting one of these locations may then allow a user to select from different folders or files stored at that location, as illustrated in section 14-3 of FIG. 10B. Selection of a particular file or folder may then reveal more options, as illustrated in section 14-3 of FIG. 10C. For example, the use may email or annotate the presentation. Selecting the present button may toggle between having the content being displayed on the wall display ("on") or not ("off").

Figure 10C:
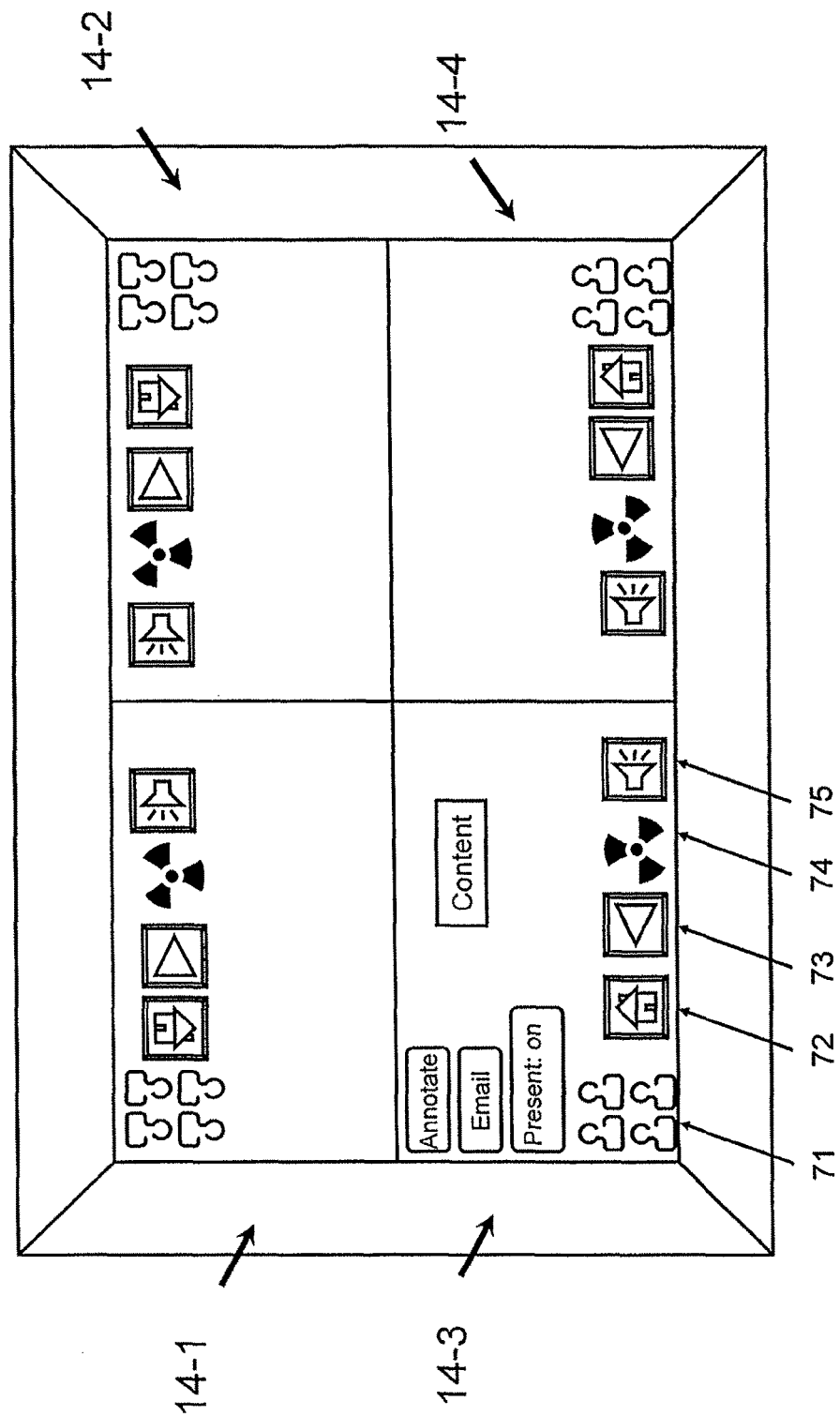
Figure 10D:
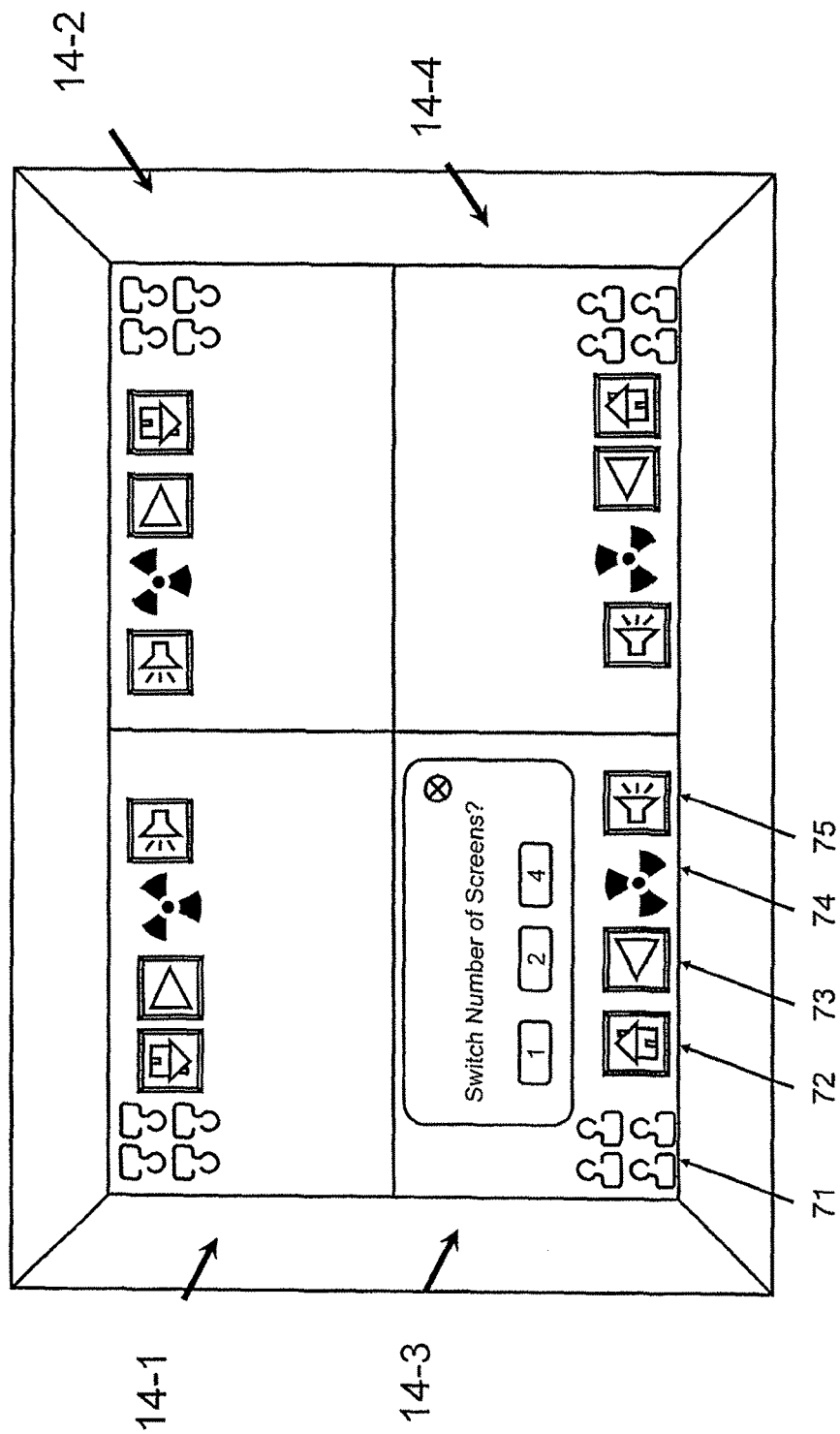

When the screen number icon 71 is selected, any user may change the number of screens being displayed on the table display, as illustrated in FIG. 10D. The altered number of screens may be oriented in a direction from which the selection was made.

Figure 12:
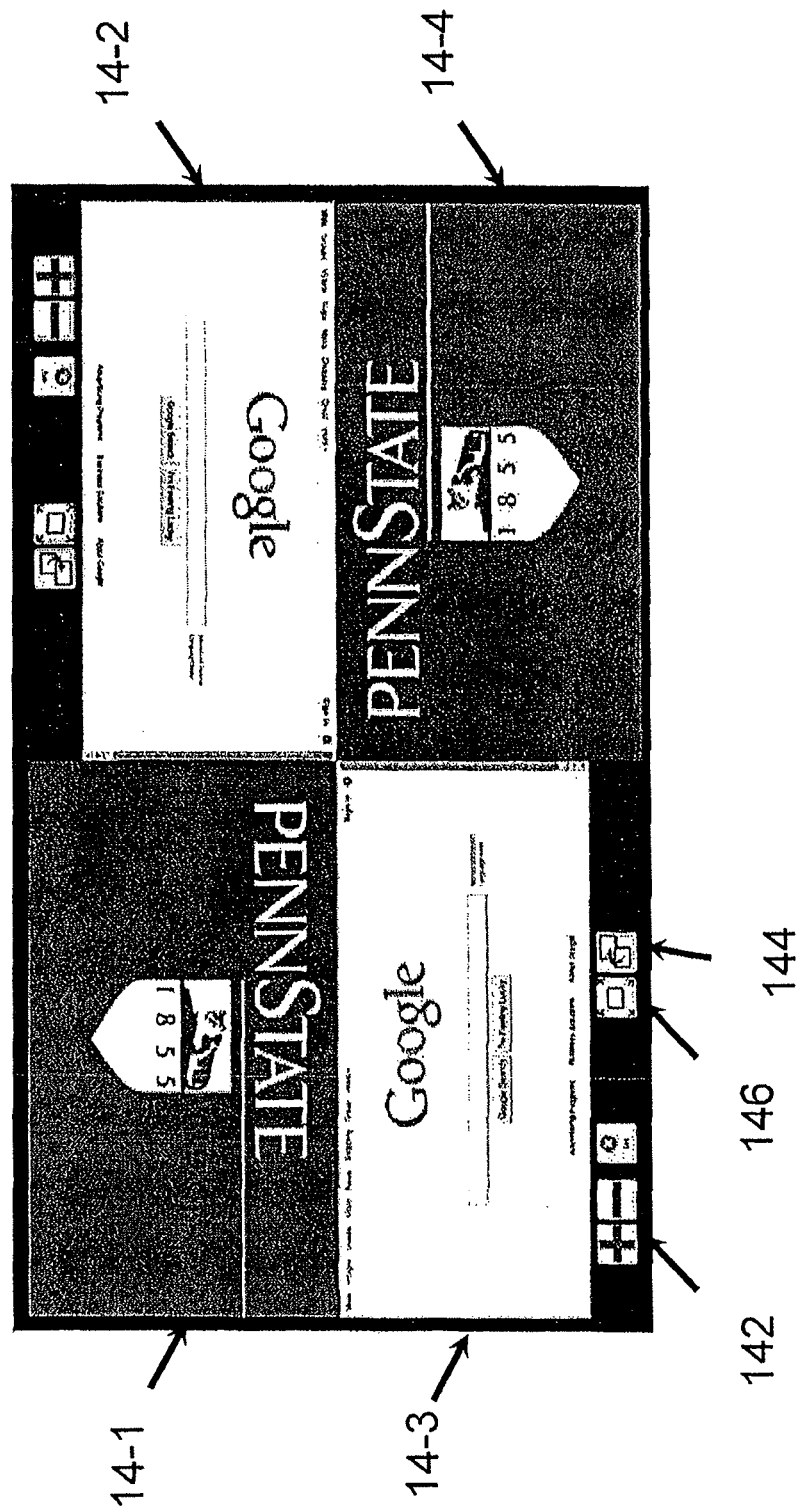
FIG. 12 illustrates a schematic top view a table display according to an embodiment.
Figure 13:
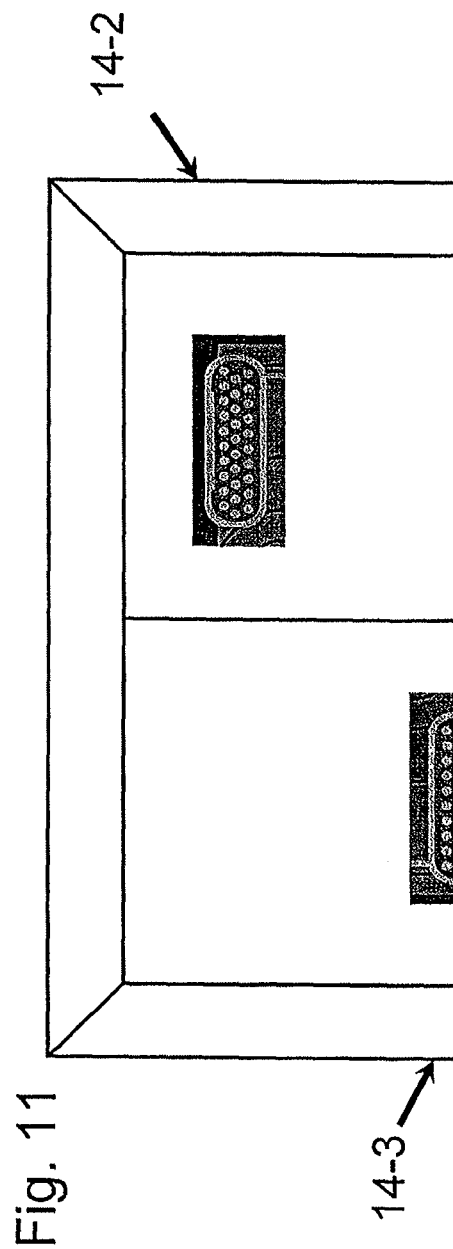
FIG. 13 illustrates a top down schematic view a table display according to an embodiment.

As noted above, the table display 14 may be divided in to multiple sections, e.g., screen sections 14-1 to 14-4. Each section 14-1 to 14-4 can be operated differently, i.e., separately and independently, by different users. Each user can select an application. Examples of applications include web browser (FIG. 12); virtual keyboard (FIG. 13); annotation applications (FIG. 10D); whiteboard applications; share laptop applications, and so forth.

Figure 11:
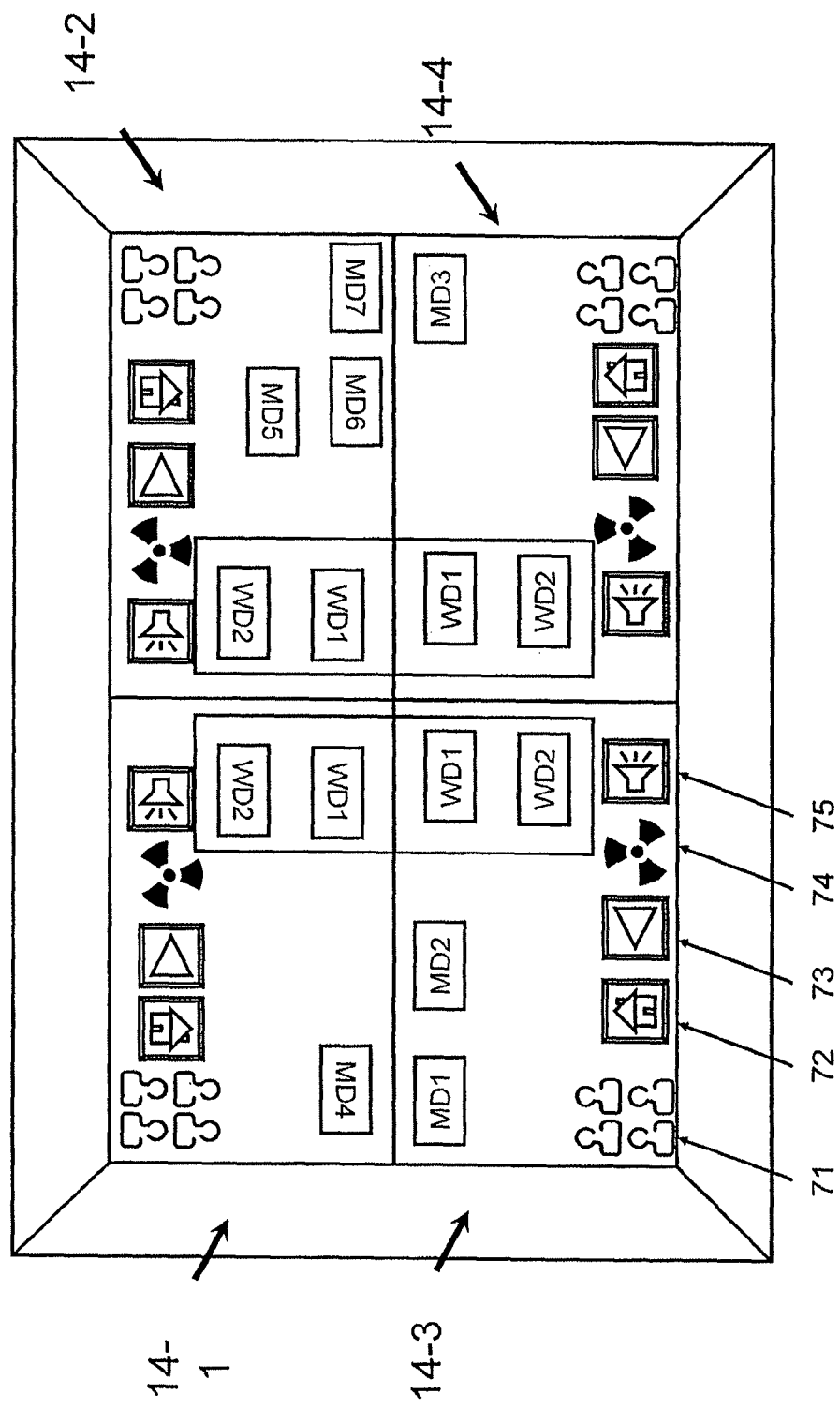
FIG. 11 illustrates a schematic top view a table display according to an embodiment.

The touch screen 14 may be used to select from different mobile devices connected to the PTC 40. For example, if there are two wall displays 30 and four connectors 16, 18 for mobile devices, at a given time four mobile devices may be connected to the PTC 40. Additional mobile devices may be connected wirelessly to the PTC 40. As illustrated in FIG. 11, the touch screen 14 may display many small versions of each of the device MD1 to MD7s connected to the PTC 40. For example, the touch screen 14 may display four of the seven devices (MD1 to MD7) connected, each in a section of the touch screen 14. In this manner a user, may view the display of four of the seven devices connected to the touch screen 14.

Tapping on one of these four sections, may then cause the corresponding device to be displayed on the wall display 20, 30 (WD1 to WD2). That is the corresponding mobile device's screen contents may be displayed on the wall display 20, 30. This may be a live video stream of the contents of the mobile device to the wall display 20, 30.

Tapping a different section corresponding to a different mobile device or dragging a particular mobile device to the wall display icon on the touchscreen, may cause a different mobile device to be displayed on the wall display 20, 30.

To see other devices on the touch screen 14, a scrolling gesture on the touch screen 14 may cause the contents of other mobile devices to be displayed on the touch screen 14.

In this manner, a user can quickly view the contents of all mobile devices connected to the PTC 40, scroll through the contents, and chose what is to be displayed on the wall display.

Web Browser Application

There is a need for a web browser app for use by multiple users in a collaborative manner. Each user may be able to browse and view websites independently without interfering with each others web sessions, yet still be able to periodically share info displayed on the websites with the other users.

According to an embodiment, each screen section 14-1 to 14-4 has its own web browser. If there are four screen sections, there may be four users, each user using a different screen section. Then each user may select the web browser app, which would display a web browser in each of the four sections.

In the initial mode, in each of the screen sections 14-1 to 14-4, the web browser may occupy about 90% of the space displayed in the screen section as shown in FIG. 10, forming a display window frame. The display window frame may be equal to the size of the screen section of slightly smaller.

When a web site is selected, the PTC 40 may display the web site within the display window frame. As shown in FIG. 10, the screen section may also contain control buttons, e.g., zoom buttons 142 for zoom (+ and −) (or an equivalent gesturing); a publish 144 for publishing to secondary screen (two screens with arrow between), and an expand button 146 (arrows extending from the four corners). When the zoom buttons 142 are tapped, the size of the content within a website is expanded, but the web page stays within the confines of the window frame.

Each screen section 14-1 to 14-4 may be limited to displaying one website at a time, or may display multiple websites and contain multiple display window frames. However, in the initial mode, all websites in one screen section is confined to stay within the area of the given screen section. In this manner, even if a user zooms in or expands a web page, this zoom will not interfere with the web pages being viewed by users, using other screen sections.

Within each screen section, each screen section acts like a conventional desktop with a touch screen interface. So, within a single screen section only one web page may be active at a time. However, if users in different sub sections have different web sites active, then multiple web pages may be active at the same time.

When a user taps the expand button 146, the website or other content in the corresponding screen section maybe expanded to cover the entire or nearly the entire primary screen, i.e., all screen sections 14-1 to 14-4. Then the expand button 146 may change to a collapse button. Tapping the collapse button will then cause the website or content to revert back to the previous mode, so that each user may operate again within their own section.

This is contrary to normal operation of touch screens. With normal operation, each user can expand or zoom content anywhere on the screen. However if there is more than one user, and each user has their own "window", each user can expand their own window to any size. Thus if one user wants to zoom in on the content in their window by expanding their window they can do so, even if it covers up others' windows, because the computer has no way to differentiate which windows belong to each user.

Secondary Screen

Hitting the publish button 144 will send the web page being viewed in the particular screen section to the secondary screen, e.g., the wall display 20, 30. In order to do this, a separate web page may be opened and displayed on the secondary screen. The computer can display the same website being displayed on the corresponding screen section, by navigating to the same web address within the web browser displayed on the secondary screen. The computer may track all user interactions (taps, drags, etc) made by the user in the corresponding screen section after navigation to the particular web address, so that not only may the same website be displayed on the secondary screen, but also the same content within the website, e.g., videos, slideshows, etc. In addition, once the website is displayed on the secondary screen, any user interactions on the primary screen can be tracked and mimicked on the secondary screen. The computer basically synthesizes mouse events on the secondary screen to match those on the primary screen.

Volume

If there is one computer driving both the primary and secondary screen, then there would be two web sessions active displaying the same thing. However, there will be a slight delay between the two sessions. This will cause a problem if audio is playing. Audio from both sessions would be heard, but a small delay on one of them.

According to embodiments, there are two ways to solve this problem:

First, when using the PTC 40 to drive both the primary and secondary screens, the publish button 144 will trigger the following action from the PTC 40. Instead of creating a duplicate session on the wall display 20, 30, the PTC 40 will just move the web session off of the table display onto the wall display 20, 30. In particular, the active web session will be displayed on the wall display 20, 30, while a static image of the webpage (updated for each new webpage).

The publish button 144 may also expand the window for this session to fill the entire wall display 20, 30. The touchscreen 14 may display control buttons including zoom buttons and movement buttons, which will now control the size and position of the web session on the wall display 20, 30. The control buttons may also include a button to bring the active web session back to the table display 14 ("grab" button). While the wall display 20, 30 displays the active website, the touchscreen 14 is still used to navigate to other websites or activating other media on the website. In other words, the touchscreen 14 is still the input device.

Alternatively, in addition to the PTC 40, another computer may be located in the wall display 20, 30. In this case, when audio is playing from the computer of the wall display 20, 30, the volume on the PTC 40 may be muted.

Virtual Keyboard

A virtual keyboard when multiple sessions are present is difficult to realize, especially in the presence of potential web browsers or web pages on some of the screen sections. A method according to embodiments allows multiple virtual keyboards on the touchscreen system described above.

Computers are designed to operate with a single keyboard at a time. If more than one keyboard is plugged into a single computer at the same time, then all keyboards will send their keystroke inputs to the same location. To have more than one virtual keyboard requires simulating keyboards in software. As illustrated in FIG. 11, a different virtual keyboard can be generated for each section 14-1 to 14-4 of the table display 14, here shown in sections 14-2 and 14-3. If a user touches a text field in a web browser or other app, the software program will request the virtual keyboard associated with the corresponding screen section, evoking a virtual keyboard that the program can display in the screen section containing the web browser. Each virtual keyboard can operate as a separate object within the program. However, the PTC 40 contains a single keyboard component, i.e., the system keyboard. When a virtual keyboard is evoked, a simulated key event is generated and sent to the system keyboard, and the system keyboard sends its output to the appropriate location within the web browser in the corresponding screen section. If the user touches somewhere else on the screen section, the virtual keyboard may be hidden.

In this manner, multiple virtual keyboards may be displayed on the primary screen and used at the same time by multiple users, where each keyboard is associated with a particular screen section. The program may then cause the System Keyboard to continually change the location of its output, depending on the particular virtual keyboard generating the simulated key events.

Note that with conventional programs there is typically one keyboard. If a user touches a web browser in a text field, then typing on a keyboard will send characters from the keyboard to the web browser. Without use of the system keyboard described above, if multiple keyboards were used, all would send their outputs to the same text field in the same web browser.

Dividing the Wall Display

Further, different mobile device contents may be connected to the two wall displays 30 illustrated in FIG. 3, allowing users can compare the contents from two different mobile devices thereon. On the Table Display can be representations of each of the two wall displays 30 (FIG. 11). Dragging a section representing one of the mobile devices to one of the wall displays 30 representations may cause the corresponding mobile device to be displayed on the corresponding wall display 30.

Furthermore, one or both of the wall displays 30 can be divided in to sections. For example, a wall display division icon can be placed on the table display. Tapping on this icon may ask the user if they want to divide the wall display 30 into, e.g., one, two, or four sections. Selecting one of these options may cause the wall display 30 to be divided in to the number of sections chosen.

For example, if one of the Wall Displays is divided in to 4 sections, then the Wall Display may be divided in to 4 quadrants. Each quadrant may be connected to one of the mobile devices connected to the Table Computer. In this manner, on each quadrant of the Wall Display may be displayed the contents of a different mobile device. So that users may view the contents of four mobile devices simultaneously on a single Wall Display.

The Table Display can be used to choose which mobile devices are displayed on the Wall Display and how many are displayed on each Wall Display.

In addition, if, for example, two mobile devices are chosen to be displayed on a single wall display and if the wall display has a 16×9 format and if the two mobile devices are streaming videos each in a 16×9 format, then the two mobile devices will not be able to be simultaneously displayed in their entirety on the Wall Display unless at least one of these was reduced to one quarter of the area of the Wall Display or smaller.

However, it may be desired to divide the screen into halves instead quarters so that the display of the mobile device screen streaming videos is larger than a quarter of the area of the wall display screen. In this case, one or both of the ½ sections may display only a portion of the video that is streamed from the mobile device. In this case, the table display 14 can be used to shift the portion of the video stream that is displayed on the wall display.

Display of Mobile Device Contents on the Table Display

In addition to displaying the content of mobile devices on the wall display, content of mobile devices may also be displayed on the table display 14. This can be achieved in a manner similar to that described above for the display of the content on the wall display.

However, when displaying content from mobile devices on the table display, since the table display is a touch screen display, buttons and other icons on the table display may be superimposed along with the content from a mobile device, e.g., as illustrated in FIG. 10C.

For example, a software program similar to that used in U.S. patent applications referenced above may be run on the PTC 40. This program allows the table display 14 to be divided in one, two, four, or more sections. For example, if the table display 14 is divided into four sections, each section may display a navigational menu, allowing four users to use the table simultaneously. One user may use one of these four sections, e.g., 14-1, and another user another section 14-3. One user may chose to use a whiteboard application or access one mobile device and another user a different mobile device. When accessing a mobile device, the contents of the mobile device may be displayed within a frame or border, where the frame contains icons that trigger various actions.

The actions that may be triggered by tapping on these icons may include: expanding a section of the screen over the entire Table Display or publishing the contents of a mobile device to the Wall Display or a section of the Wall Display.

Wall Display as a Touch Screen

In addition to the table display 14 being a touch screen, the wall display 20, 30 may also be a touch screen. Similarly to the table display 14, when the wall display 20, 30 is a touch screen, icons for various actions may be superimposed on the content from mobile devices on the wall display 20, 30. Indeed, the wall display 20, 30 as a touch screen can be used as the primary input and may be used without a table display 14.

Network of Multiple Tables

Figure 14:
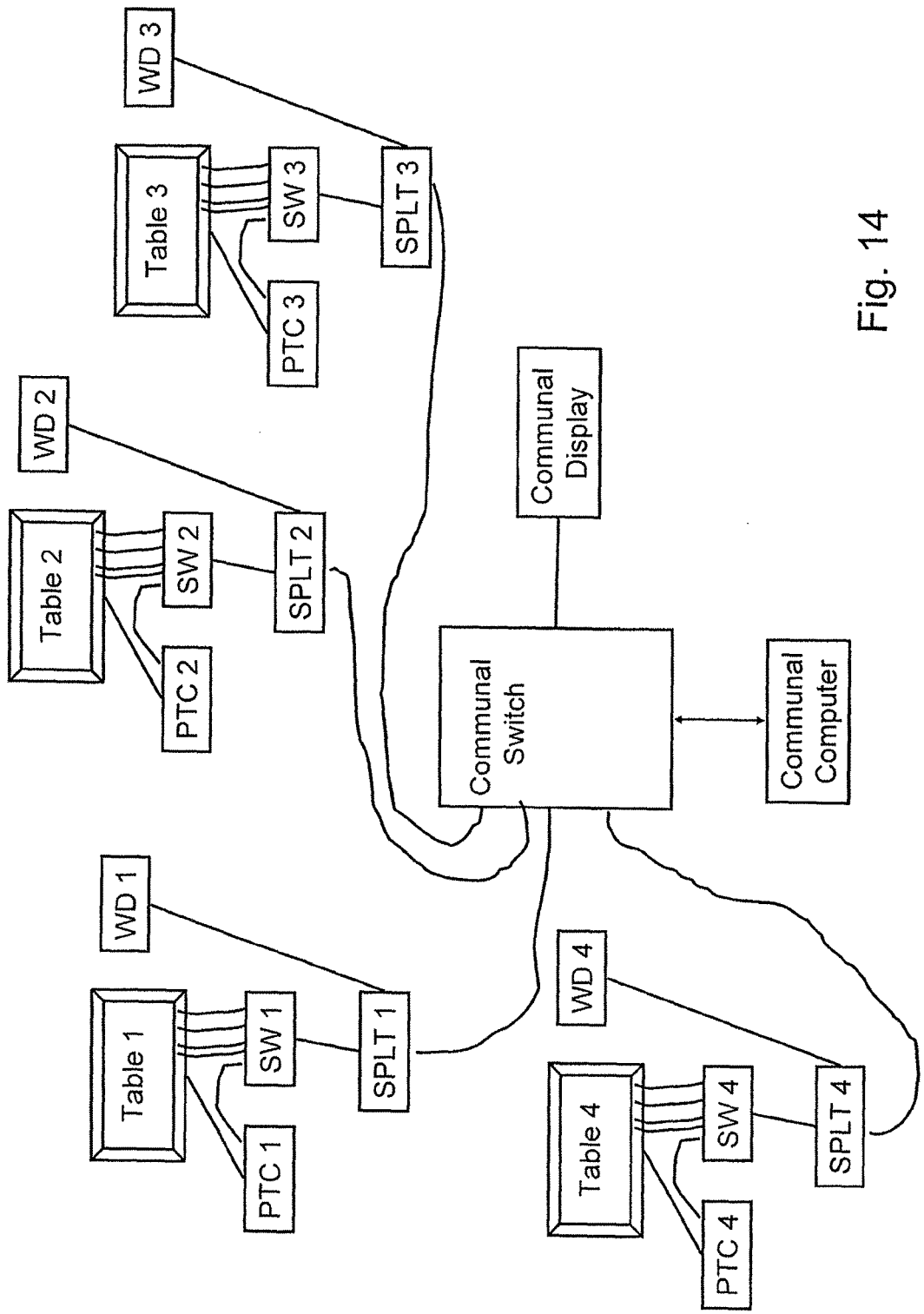
FIG. 14 illustrates a block diagram of a network according to an embodiment.

In another embodiment, multiple tables may be networked together, where each table has an individual PTC 40. For example, as illustrated in FIG. 14, assume there are four tables table 1 to table 4, each with a PTC., PTC 1 to PTC 4, and each with four hardwired connections. Each table may also have many mobile devices connected wirelessly as described above.

As illustrated in FIG. 14, the network further includes a communal switch, here a 4×1 switch receiving outputs from each table. The output of the communal switch is connected to a communal display. The video cable on each of the four tables that connects the output of the local switch, i.e., SW 1 to SW 4, to the local secondary display, i.e., WD 1 to WD 4, has a splitter, i.e., SPLIT 1 to SPLT 4, to provide an additional output to the communal switch.

The communal switch may be controlled by a communal computer, which may be on the same wireless network as the four tables. A user can then use a mobile device to control the communal switch and thereby change the contents on the CT to that of any of the 4 tables.

If two communal displays are used, the same method can be use with a communal 4×2 switch.

If multiple users are seated at each of multiple tables all connected on a single network, then it may be desirable for a user at one table to view not only the content from mobile devices connected to that table but also devices connected to other tables. For example, video information displayed on the wall display 20, 30 may be transmitted to other tables. Here, a splitter may be used to provide the output of the communal switch to each wall display WD 1 to WD 4. Therefore, instead of or in addition to a communal display, all wall displays may display the same content.

Session Tracking Mode

Figure 15A:
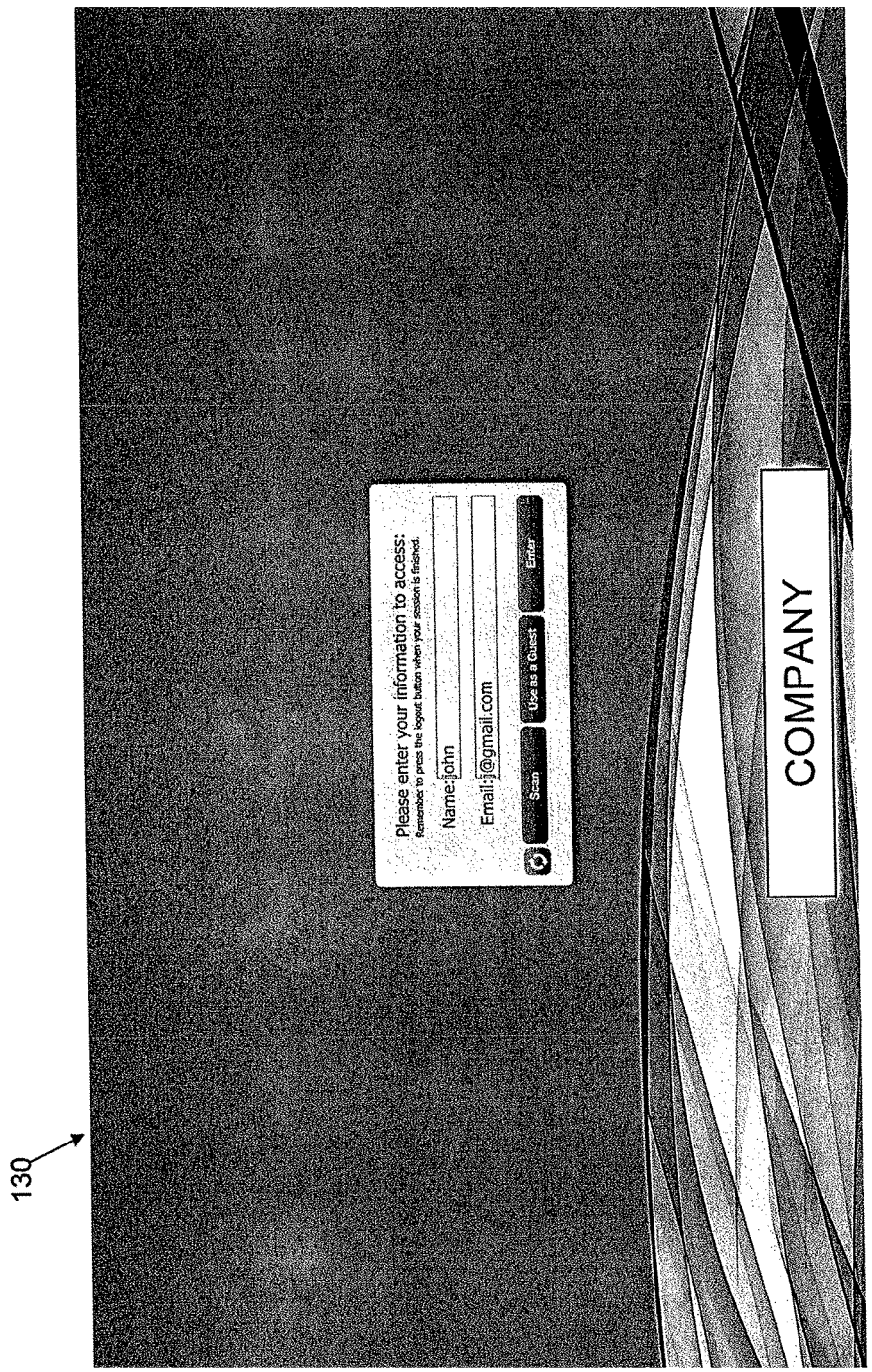
FIG. 15A is a screen shot of a home screen for a display operating in a session tracking mode.
Figure 15B:
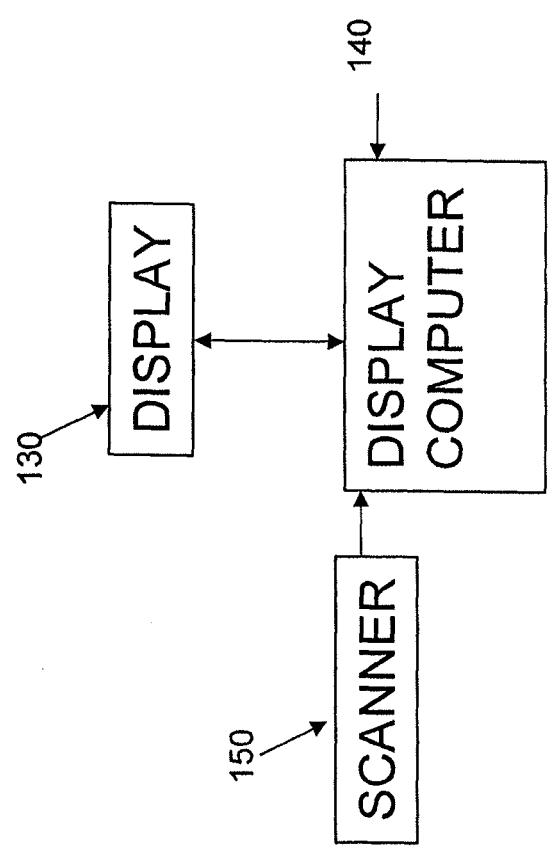
FIG. 15B is a block diagram of a system according to an embodiment.

Another application in which the touch screen display 130, e.g., a multi-user continuous touch screen display (either a touch screen table or a touch screen wall display, with or without secondary screen(s), may be deployed is in session tracking, e.g., for use in retail, trade shows, medical clinics, schools, etc. A home page of the display 130 in session tracking mode is illustrated in FIG. 15A. A block diagram of a system including the display 130, a display computer 140, and a scanning unit 150 is illustrated in FIG. 15B.

When no users are logged in, the display 130 (as well as any secondary screens associated therewith) may be in sleep mode, in which images or videos may be displayed. A single gesture on the display 130 may wake up the display computer 140, and, when session tracking is on, a prompt including an input window may be provided, as illustrated in FIG. 15A. While the particular example shown in FIG. 15A is for a single user mode, multi-user modes may also be employed, as described below. In such multi-user modes, an input window is provided for each sub-screen.

To begin using a session tracking mode, a user may enter identifying information, e.g., name and email address manually, or, if badges have been provided to users, may scan the badge, e.g., having a bar code thereto, to upload identifying information, which may include, e.g., a company name, email contact information, industry, position in the company, work address, and so forth. For example, as illustrated in FIG. 15B, a scanning unit 150 may be connected, e.g., directly connected, to the display computer 140. Other types of automatic identification, such as retina scan, finger print scan, face identification, and so forth. Depending on the type of use, this identifying information may include more security measures, e.g., password, biometrics, dongle codes, etc., The session tracking mode may then associate all activities taken in that screen (or sub-screen, as detailed below), e.g., what icons were activated, how long each was active, whether any information was requested, who the user communicated with online, etc., with that identifying information, and provide the activity information along with the identifying information to the company hosting the display. The session tracking mode may also provide any information requested by the user. For example, numerous instantaneous email requests may be problematic, so a user may place requests in a shopping cart, which is stored for that session, and the requests may later implemented, e.g., emails sent from a server in the cloud. Logging into a particular sub-screen will not affect operation of the other sub-screens.

In other words, the computer 140 may associate all activities implemented in a session with the user's information. Each session starts with a user entering their information or tapping use as guest and ends with a logging out of the session or a given amount of idle time. If the use as guest button is tapped, the activities are still tracked with the given session. If the guest user later taps the log in button, described below, then that information can be tracked to the user's information added later. Otherwise, the information can still be tracked, although not attached with a specific user's identifying information.

The scanning unit 150 may have fewer scanners than a maximum number of sub-screens for the display 130, e.g., the scanning unit may only have one scanner. To associate the identifying information with the activity in a particular sub-screen, a user must select a scan button in that sub-screen login window before scanning a badge. If another user attempts to scan while the scanning unit 150 is busy, a please wait message may appear. All sessions may be operated independently and simultaneously, as discussed above regarding the operation of the sub-screens. Alternatively, if the scanning unit 150 includes a dedicated scanner for each sub-screen, the scan button may be replaced with a scan now prompt.

Figure 15C:
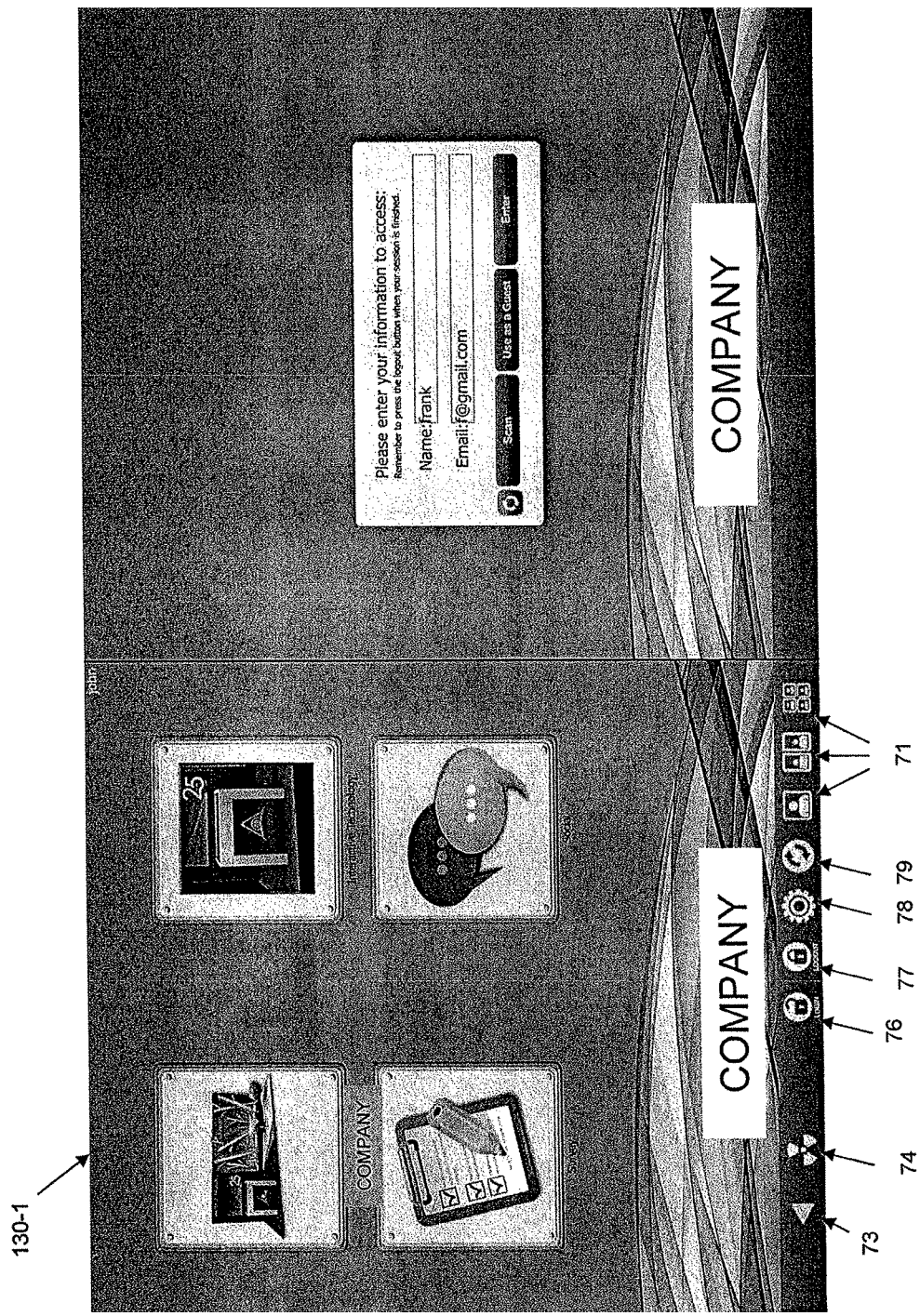
FIG. 15C is a screen shot of a display operating in a session tracking mode in a two person configuration.

As illustrated in FIG. 15C, once the identifying information has been entered, the session tracking begins and the user may be provided with a sub-screen 130-1, here the display is operating in two user mode, that displays various application icons from which to select and that may display the current user's name, e.g., in the upper right hand corner of the sub-screen. For example, general information about the company, e.g., in the form of documents or media files, may be displayed by selecting a company icon. Interactive sessions, e.g., related to various products, conditions, coursework, etc., may be displayed by selecting an interactive technology icon. Surveys or tests, e.g., related to various products, conditions, coursework, etc., may be displayed by selecting a survey icon. Different manners of external communication may be displayed by selecting a social icon. These application icons are only illustrative and greater or fewer, as well as alternative, icons may be deployed. In another embodiment, the first icons located on the top level of this home screen are product categories that later are used to determine how the owner of the system can divide the session tracking information obtained among its sales force. Therefore, by forcing users to select product categories to view other information, the owner determines which product categories the user is most interested in. Then the lead information associated with these users can be sent to the appropriate sales team members for the particular product categories.

In addition to the application icons, each sub-screen may include various control icons, e.g., number icons 71, the back icon 73, the session end icon 74, a login icon 76, a logout icon 77, a gear icon 78, and a rotate icon 79. These control icons are only illustrative and greater or fewer, as well as alternative, icons may be deployed.

For example, if a user signs in as a guest, and then wishes to login, they may select the login icon 76 and the login window will appear. The rotate icon 79 allows the user to rotate the orientation of the sub-screen. The number icons 71 allow the user to select a number of sub-screens to be provided on the display 14.

Figure 15D:
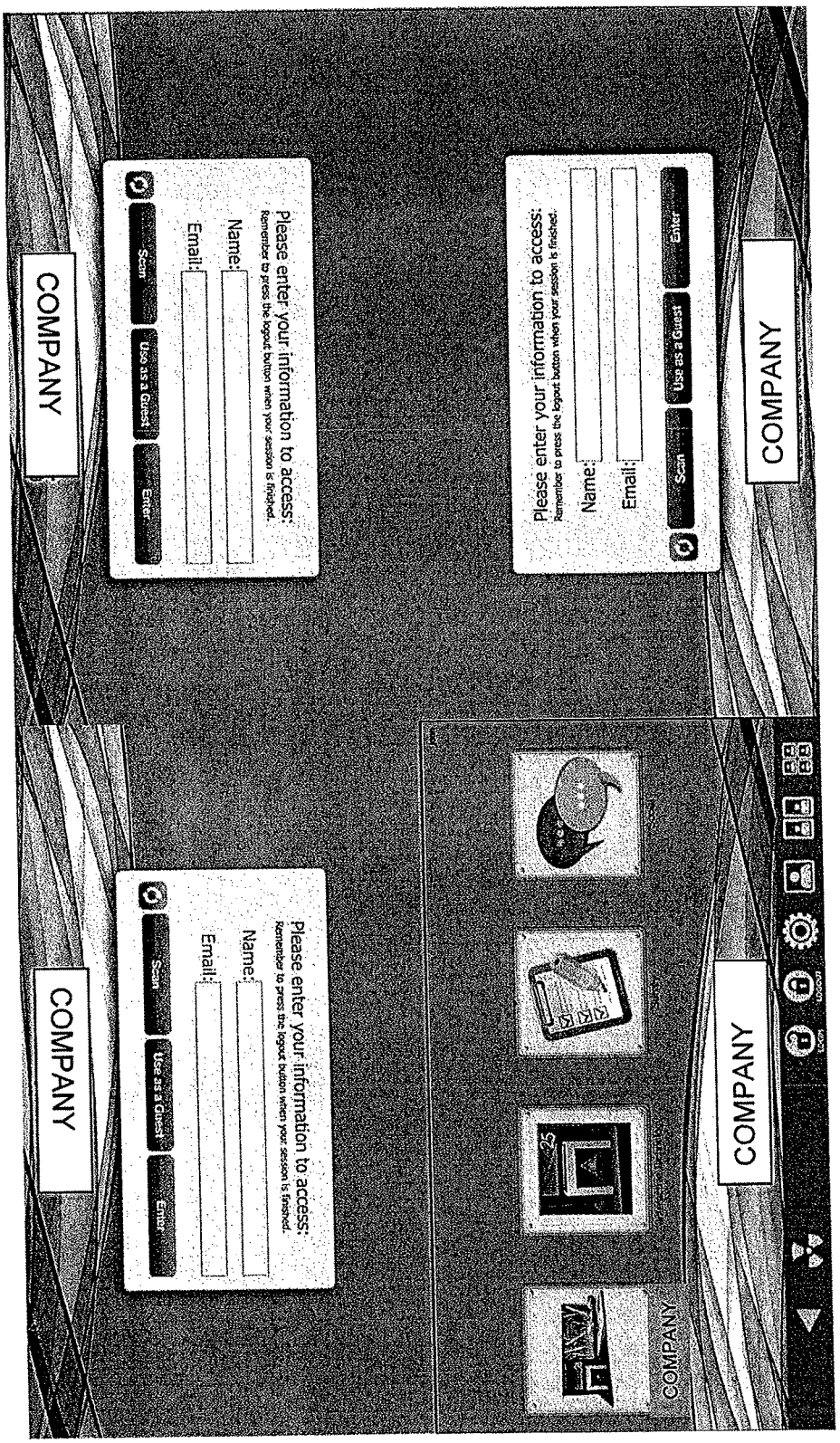
FIG. 15D is a screen shot of a display operating in a session tracking mode in a four person configuration.
Figure 15E:
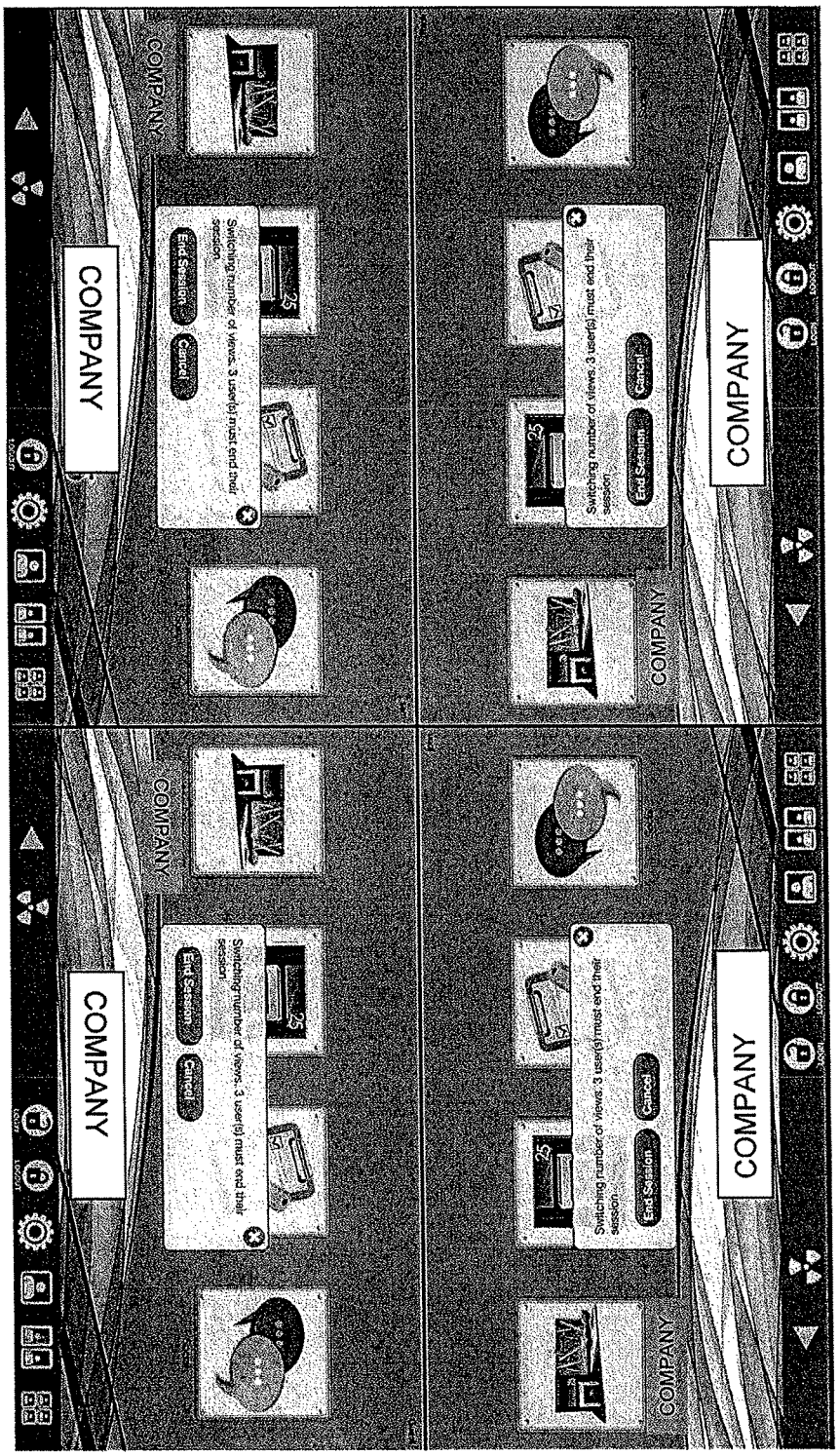
FIG. 15E is a screen shot of a display operating in a session tracking mode in a four person configuration, in which a request has been made to switch to a single screen configuration.

For example, if the number icon 71 indicating a four person mode is selected, the display 14 may now display four sub-screens, as illustrated in FIG. 15D. If the number icon 71 indicating a fewer person mode than those currently logged in, a message will appear in each sub-screen requesting an excess number of logged in users logout. For example, as illustrated in FIG. 15E, if the display 14 is operating in four person mode and all sub-screens are being used, and the single person mode is selected, then a message will appear in all sub-screens requesting that three users end their session.

The touch screen display and table computer system can then be configured to capture a range of information associated with each user session. This information can include, for example, the particular items or types of items that are viewed or tapped, videos that are activated, and information that is requested. Surveys can be taken and answers stored with each user. In addition, if a customer at the touch screen display 130 requests specific information, the sales person can pull up information on the touch screen and either the sales person or user can annotate, e.g., take notes, directly on the information page. Additionally or alternatively, a whiteboard application may be used to draw, take notes, make comments, and so forth. All of this information can be stored and associated with the particular user session.

The computer 140 may be configured to provide numerous reports. The types of reports that the computer can generate depend on whether or not the session tracking mode is employed. When the session tracking mode is not employed, the home sub-screens in a non-sleep mode would appear as subs-screen 14-1 in FIG. 15C, but without a user name appearing. In other words, the login window would be bypassed. Even when operating in a non-session tracking mode, the computer 140 may generate a summary report over a certain time period or event horizon. Such a report could include a bar chart of the top five brochures, pictures, video, etc., by number of views, total number of top level taps per day or time utilization per day of an event horizon, e.g., a trade show. Any identifying information gathered and/or content requested/sent could also be reported.

Additionally, with session tracking mode is used, detailed reporting associated with particular session and/or identifying information could be generated. For example, the computer 140 could be configured to generate a contact report that includes contact information as input manually or scanned plus viewed file information, or more detailed information, such as length of time before a viewed file was navigated away from. Additionally, particular users could be associated with particular salespeople and the number of users providing their identifying information versus those remaining as a guest could be tracked.

The computer 140 could be configured to provide reports compatible with other software internal to the company and/or as a simple, widely used file format, e.g., comma separated values (.csv) to be compatible with third party software, and, more specifically, lead retrievable software, e.g., SalesForce.

When in a tradeshow or event environment, often the bar code or identifying information on a badge or related identifying device is not known in advance of receiving the identifying information. In this case, a pre-event configuration session can be run on the table. During the pre-event session, the pre-event configuration mode is first activated. Then a first bar code or other identifying device is scanned and entered in to the computer. This first bar code that is entered has known identifying information: last name, first name, email address, company information, etc. There are multiple ways to interpret the data that is returned from the scanner, depending on how the barcode or other identifying device was encoded. At this point, the computer 140 uses a decoding algorithm to determine how the data was encoded on the identifying device. Several known decoding methods are stored on the computer 140. Each method is used by the computer 140 sequentially until a correct decoding method is determined. For example, each method is applied and the data is loaded into the data fields: last name, first, email address, etc. Then this data is compared to the data that was entered manually for the first bar code and, if a match occurs, then the decoding method is then stored as the active decoding method to be used in the session tracking mode. If no known method is found, then data returned by the scanner and computer can be viewed visually to find the correct data encoding method. A human can often by visual inspection find the encoding method that is used and then enter the algorithm in to the computer 140, where it is then stored for future use. If this is still unsuccessful, the login window may appear without the scan option.

Mobile Device Application

While the large format displays discussed above are highly useful, particularly in multi-user environments, the number of users is limited, they take up space, e.g., horizontally or vertically, are expensive, and providing numerous such displays may not be practical. Utilization of such large format displays in accordance with embodiments may be further enhanced by a separate mobile device application (MDA) being installed in a mobile device 200, e.g., an Ipad® or other tablet computer, smartphones, etc., in addition to the displays as discussed above. Such mobile devices 200 may be readily distributed to numerous users, e.g., employees of the company, particularly salespeople. In particular, the MDA may allow all associated display computers, e.g., at different locations, and mobile devices for a particular company to be synchronized, e.g., on a daily basis, through a common server, e.g., in the cloud, such that all associated display computers and mobile devices may store the same files to be displayed. For example, a remote management system may be used to modify data and change the data on all associated display table computers and associate mobile devices having the MDA thereon.

In embodiments, when data is changed or loaded on to a large format display, the data is loaded first to a cloud server computer with the remote management system. This data is then pushed from the cloud to all associated display computers to have all displays match the master server data on the cloud server computer. The MDA can have a "sync" or "update" option so that all mobile devices running the MDA when updated, will sync to the cloud server computer. In this manner all mobile devices running the MDA and all associated large format displays will have identical data (all matched to the data on the cloud server), i.e., files to be displayed.

The data that is synchronized and matched on all of the mobile devices and large format displays may consist of product brochures, videos, photos as well as any changes to background images and icons and product categories. In particular, in addition to storing identical data files on both the display computer 140 and the mobile devices 200, organization of data files may be mirrored, such that folders, subfolders, etc., may be the same.

Further, the MDA will typically match the functions of the table: i.e. will present icons, functions and features very similar to those on the large format touch screen display. For example, both the display computers and the MDA may support a whiteboard application.

Figure 16:
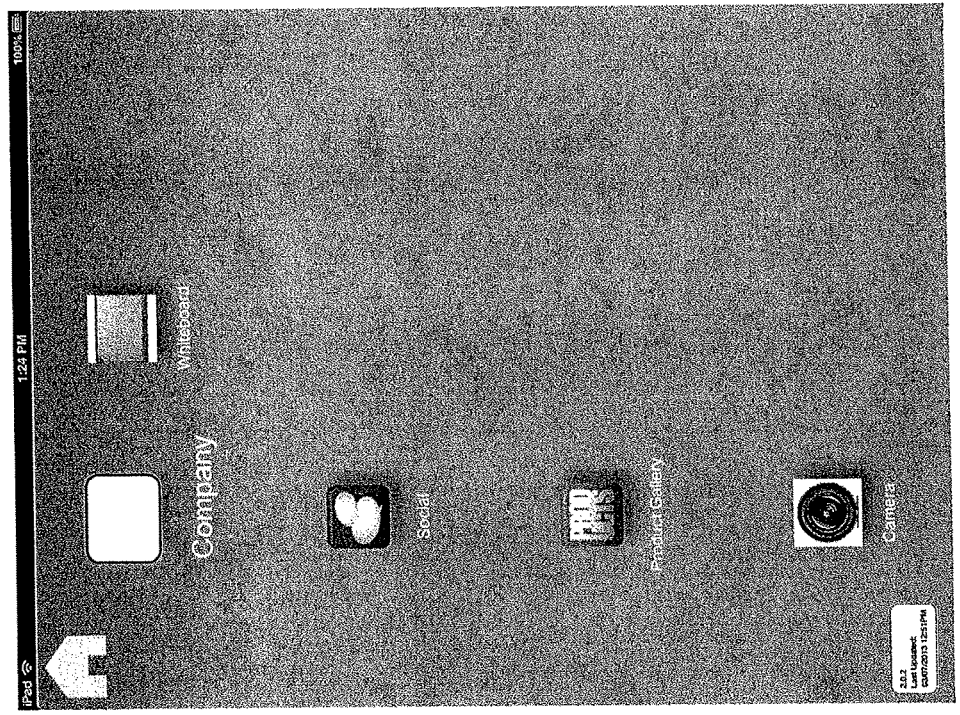
FIG. 16 is a screen shot of a home screen for a mobile device operating a mobile device application in accordance with an embodiment.
Figure 18C:
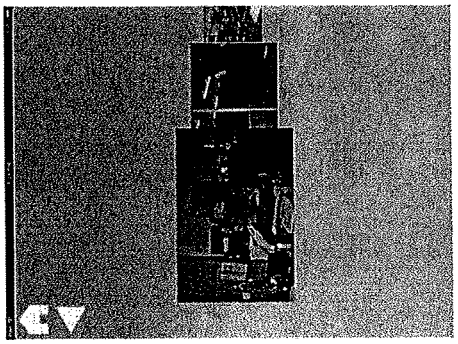
FIGS. 18A to 18F are screen shots of a film strip implementation for selecting a media file after selection of an icon in FIG. 17.
Figure 18F:
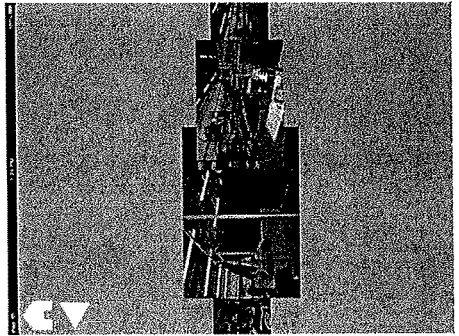
Figure 18B:
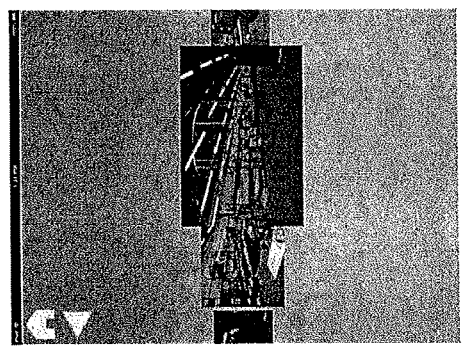
Figure 18E:
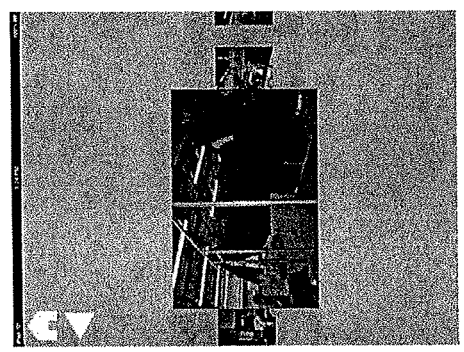
Figure 18A:
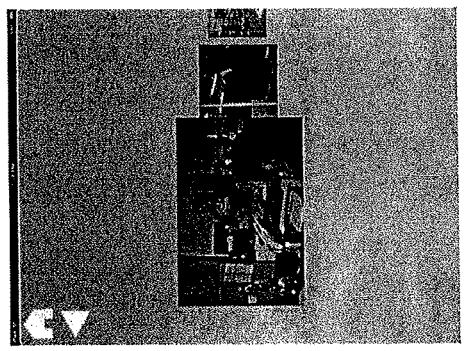
Figure 18D:
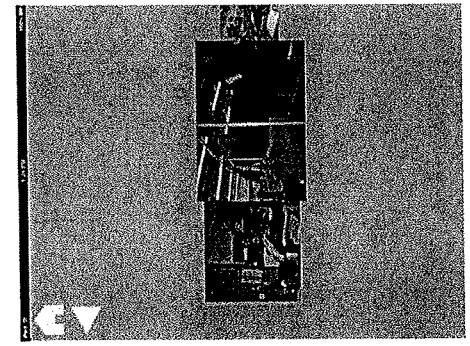

A screen shot of a home screen of the MDA on the mobile device 200 is illustrated in FIG. 16. The user of the mobile device 200 may navigate using the icons shown therein, e.g., a company overview icon, a whiteboard icon, a social icon, a products gallery icon, and a camera icon. The company overview icon and the products gallery icon would provide access to files to be displayed. Once a particular document file or media file is selected on the mobile device 200, as discussed below, that file, which also is stored in the display computer 140, may be displayed on the display 130. The display 130 may be any of the displays, e.g., wall display or table display, discussed above, associated with the mobile device 200, e.g., all belonging to the same company or for the same company unit. The computer 140 may be configured to automatically allow the file from the mobile display device 200 to be displayed on the display 130 (or a secondary screen, which may or may not be touch screen displays, but do not provide the primary control of the display computer 140, if used) or may be configured to request permission from a user of the display 130. Remaining icons shown on the home screen provide additional self-contained functionalities within the MDA.

Figure 17:
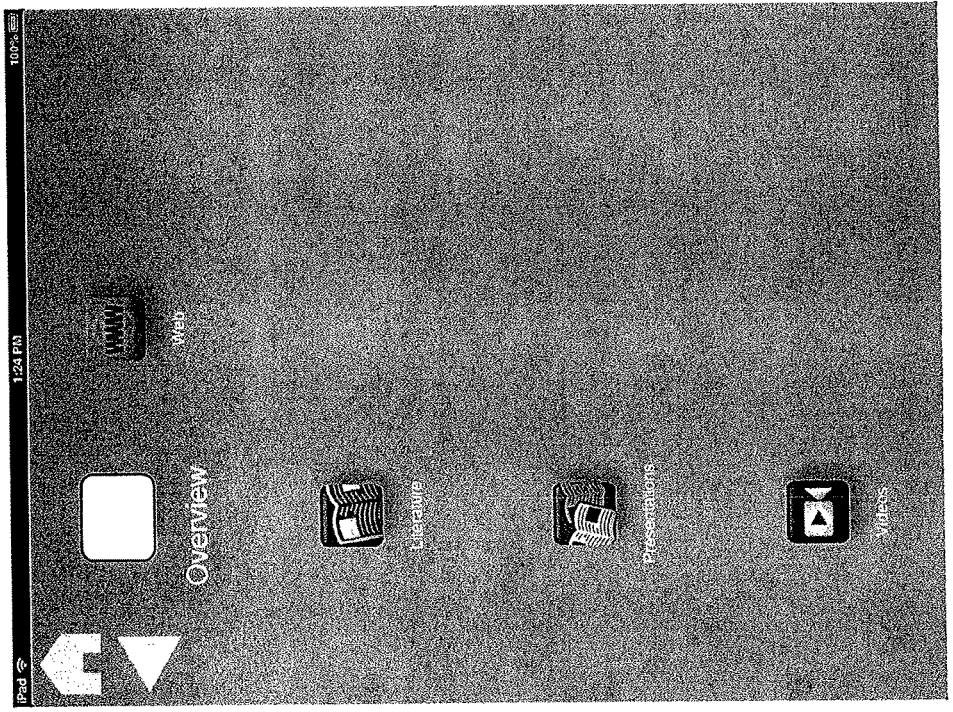
FIG. 17 is a screen shot of a screen for the mobile device operating the mobile device application after selection of a company icon in FIG. 16 in accordance with an embodiment.
Figure 19D:
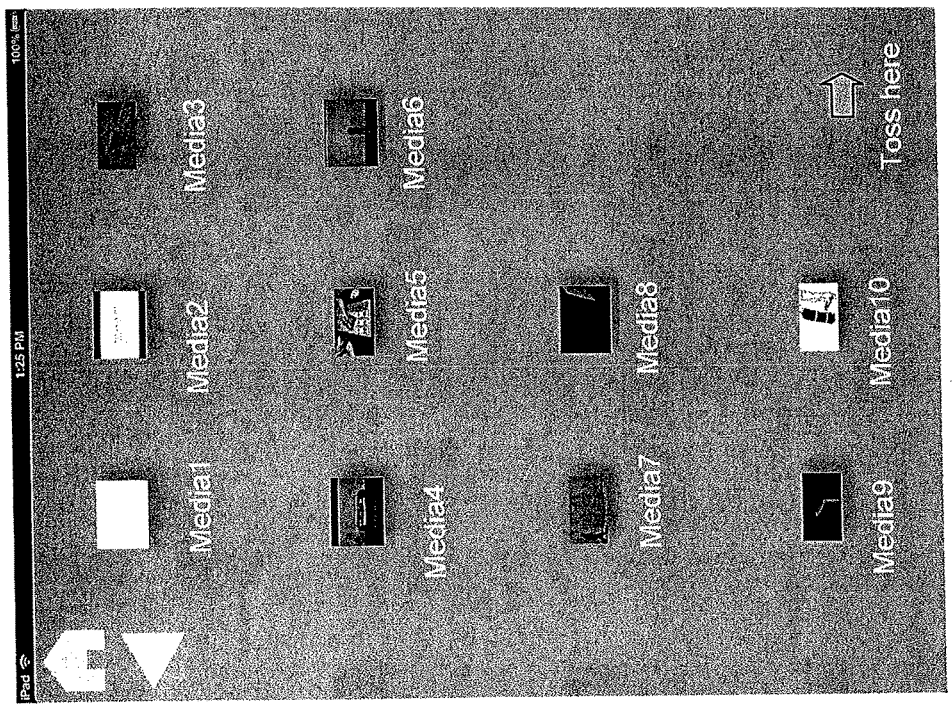
FIG. 19D is a screen shot of a array implementation for selecting a media file after selection of an icon in FIG. 17 and after the mobile device is connected to a display.
Figure 19A:
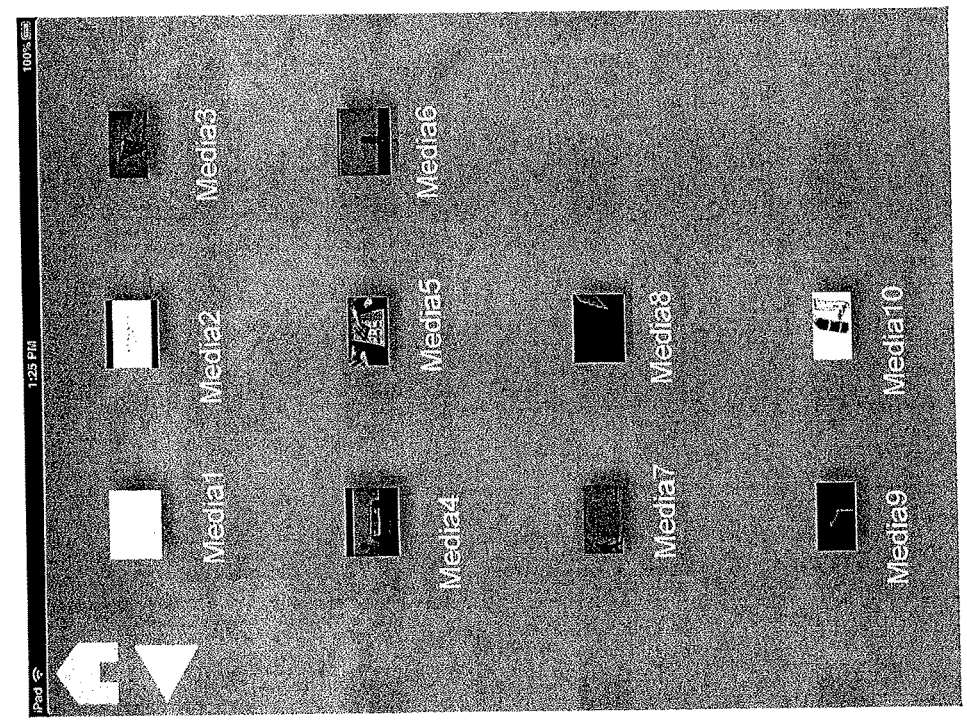
FIG. 19A is a screen shot of a array implementation for selecting a media file after selection of an icon in FIG. 17.
Figure 19C:
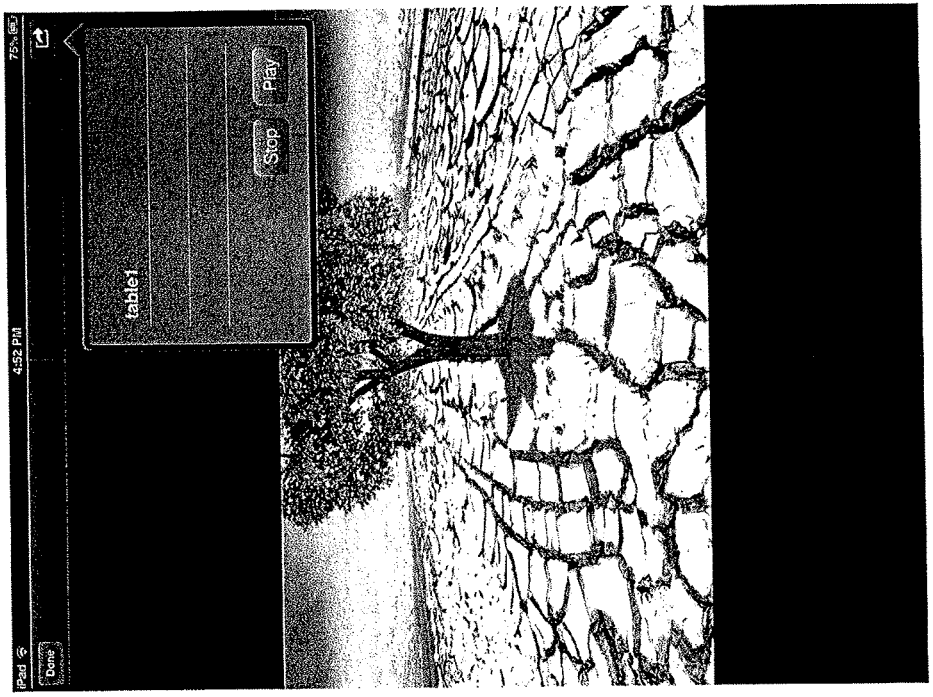
FIGS. 19B and 19C illustrate displaying of a video after selection of a media file in FIG. 19A.

Selecting the company icon in FIG. 16 may result in a screen illustrated in FIG. 17 being displayed. Additional icons will be displayed on this screen, for example, a product media icon, a world wide web icon, a literature icon, a presentation icon, and a video icon. If the video icon or a product media icon is selected, numerous photos or videos may be displayed on the mobile device 200. For example, the media files may be displayed in a film strip mode, in which dragging in the direction of an image to be viewed will scroll through the images, with a next image be bigger than remaining images, as illustrated in FIGS. 18A to 18F. Alternatively, these images could be arranged in an array, as illustrated in FIG. 19A.

Figure 19B:
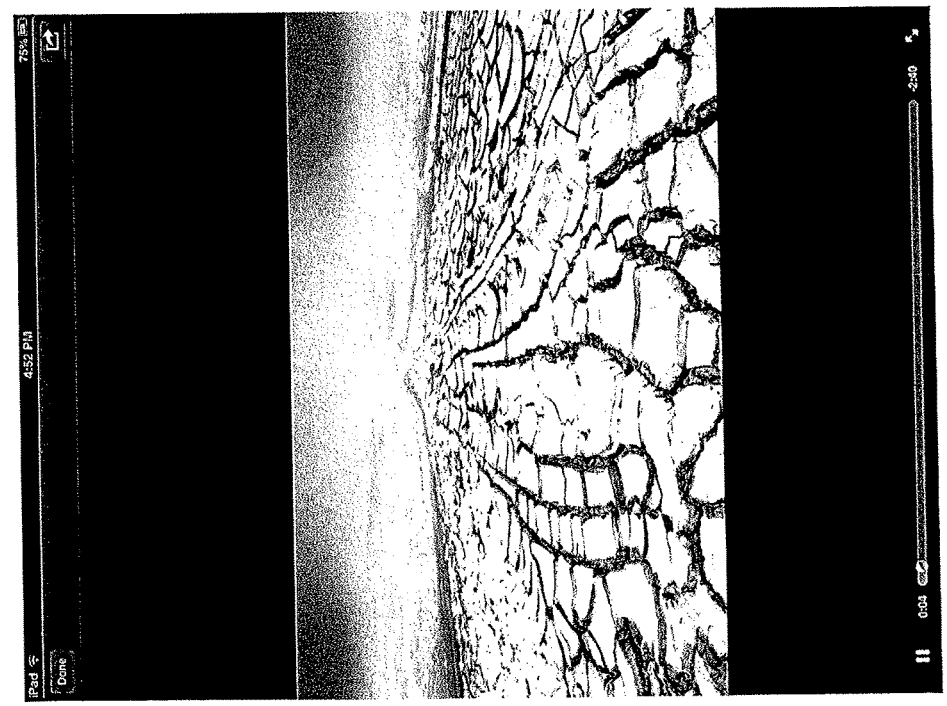

When a media file is selected, e.g., a video illustrated operation of the display 14, that video will then be played on the mobile device 200, as illustrated in FIG. 19B. Once that media file has been selected, an arrow may appear, e.g., in an upper right hand corner of the mobile device 200.

Selection of that arrow may allow available displays associated with the MDA to be selected. If the selected display is operating in a multi-user mode, the sub-screen into which the file is also to appear may be selected. Once selected, a handshake may be performed between the display computer 140 associated with the selected display and the mobile device 200. After the connection between the computer 140 and the mobile device 200 is established, the user of the mobile device 200 may hit play to show the media file on that display, or may drag or toss any of the files off the screen of the mobile device 200 or in a particular direction to have that file displayed on the selected display. Alternatively, as illustrated in FIG. 19D, once connected, a toss here icon may appear on screens of the mobile device 200.

The large format display or sub-screens thereof may be locked to prevent the media files from the mobile device 200 from being displayed thereon or may require permission by a user before being displayed. For example, when particular applications are running on the large format display, the display may be locked, while, for other particular applications, e.g., group sharing or brainstorming, the display may be unlocked so files from any associated mobile device 200 may be displayed thereon.

Since the computer 140 has the same files stored therein as the mobile device 200 accessed for the MDA, such communication does not involve transferring all of the data for that file, but only some form of file identification, e.g., file name. Thus, display of file selected on the mobile device 200 using the MDA may be easily realized, even over a heavily used network.

When the mobile device 200 and large format displays are on the same wireless network, identification of the large format displays associated therewith is straightforward. When not on same wireless network, the MDA may locate proximate associated large format displays using through global positioning system data.

Figure 20B:
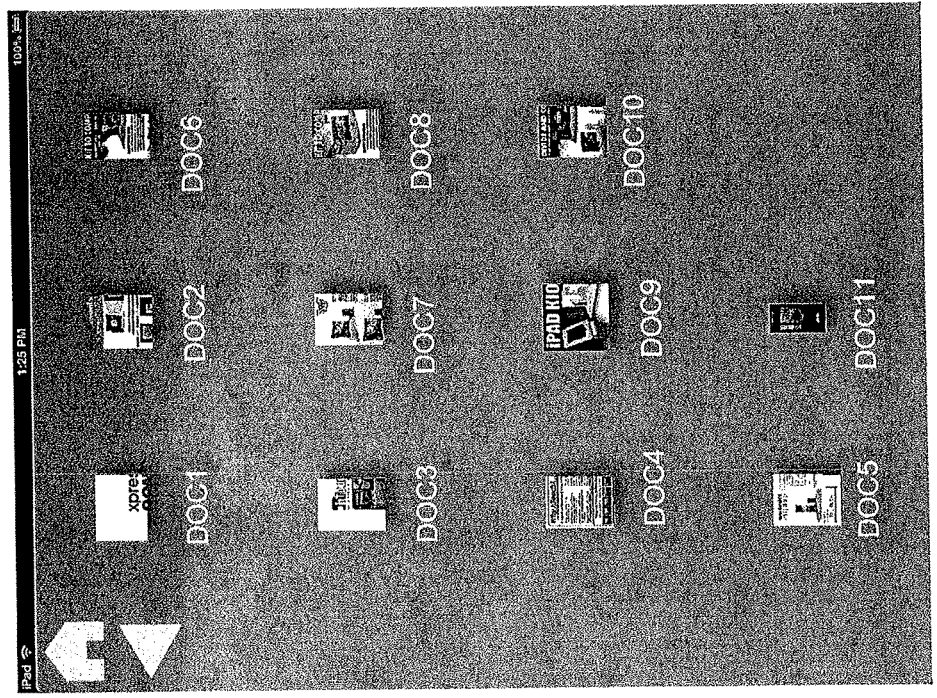
FIGS. 20A and 20B are screen shots of for selecting a document file after selection of an icon in FIG. 17.
Figure 20A:
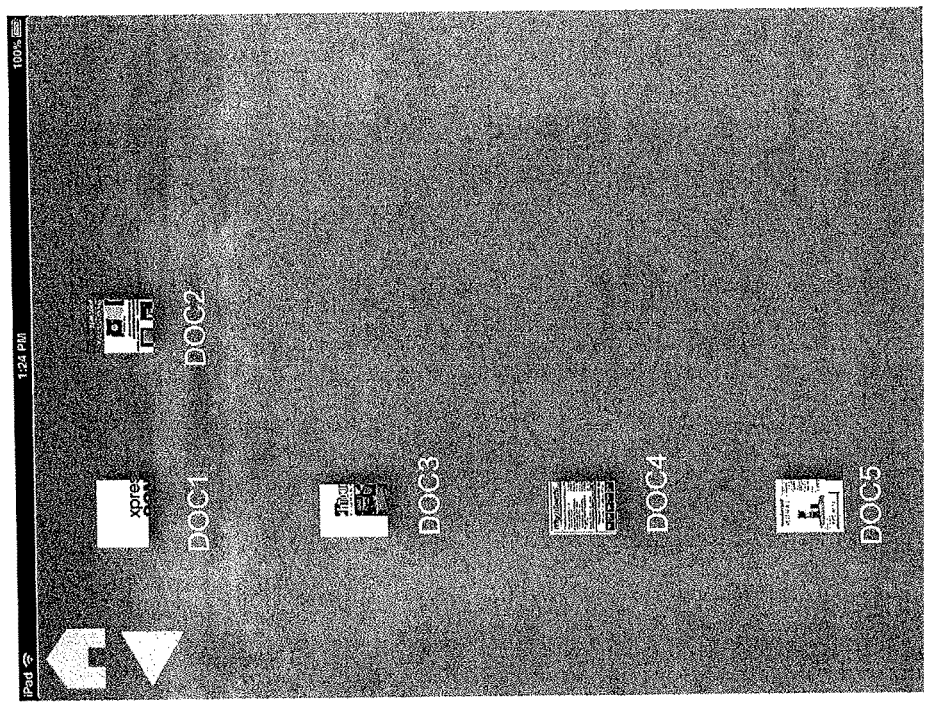

Selecting the literature or presentation icon in FIG. 17 will display numerous documents, e.g., pdf documents, as illustrated in FIGS. 20A and 20B. The MDA may include a buffer such that individual documents may be accessible, as illustrated in FIG. 20A, before all documents are loaded, as illustrated in FIG. 20B.

Figure 21:
FIG. 21 is a screen shot of a screen for the mobile device operating the mobile device application after selection of a camera icon in FIG. 16 in accordance with an embodiment.

FIG. 21 illustrates a screen shot resulting from selection of the camera icon in FIG. 17. Once a photograph has been taken, the images from the camera roll also appear in this screen. Here, the arrow in the bottom of the screen allows selected information thereon to be emailed and/or bandwidth permitting, to send that information to the display. Of course, this would involve more data being transmitted than just a file name, as with the stored files.

Figure 22:
FIG. 22 is a screen shot of a screen for the mobile device operating the mobile device application after selection of a whiteboard icon in FIG. 16 in accordance with an embodiment.

FIG. 22 illustrates a screen shot resulting from selection of the whiteboard icon in FIG. 17. Once notes have been taken, saved notes may also appear in this screen. Here, the arrow in the bottom of the screen allows information selected thereon to be emailed and/or bandwidth permitting, to send that information to the display. Of course, this would involve more data being transmitted than just a file name, as with the stored files.

When the large format display is operating a session tracking mode, by having the mobile device 200 connect to a particular sub-screen or session, all of the activities performed on the mobile device 200 may be associated with that session, e.g., using the remote management system or by providing the activities on the mobile device 200 to the display computer 140 concurrently or subsequently. The activities on the mobile device that may be associated with the session may include annotations or notes on the whiteboard or photos taken, that may not be displayed on the large format display during the session. In other words, some of the information to be associated with the session may not be shared or known to the user of the session, but just to the user of the mobile device.

Figure 23B:
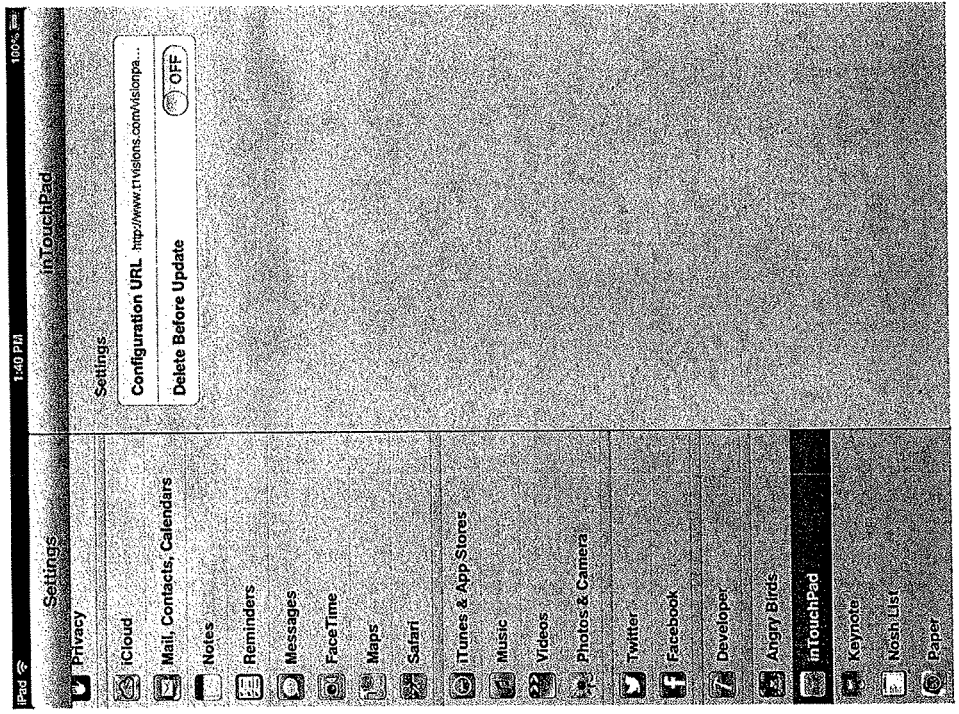
FIG. 23B is a screen shot of a screen of the mobile device in which the mobile device application is to be selected.
Figure 23A:
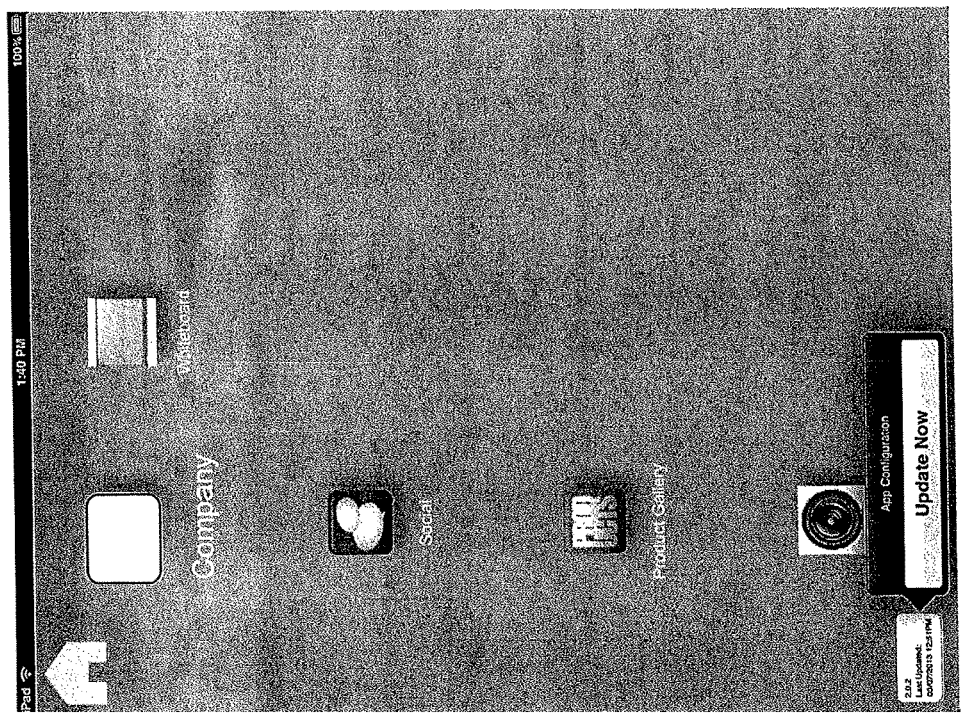
FIG. 23A is a screen shot of the home screen of the mobile device application in which the mobile device application is to be updated.

FIG. 23A illustrates the home screen when the remote management system indicates that an update is available in the cloud. Of course, these updates may occur automatically whenever data on the cloud server for the remote management system is changed or automatically only at a predetermined time. FIG. 23B illustrates how the MDA, here called InTouchPad™, is accessed from an application screen of the mobile device 200.

FIG. 24 illustrates a screen shot of a home screen on the mobile device 200 according to another embodiment. Here, a scan badge icon 310 is used to scan a badge. When a first sales person at the trade show booth uses a mobile device like a mobile phone or tablet, to scan a first customer's badge, the information that is scanned is then sent to a cloud storage and is associated with the particular tradeshow. Such scanning can be repeated many times and, now, in cloud storage stores information of multiple people attending the tradeshow and visiting the trade show booth.

Figure 25:
FIG. 25 is a screen shot of a screen of the mobile device in which data has been downloaded from the cloud.

Then, a second sales person shows a second customer information on one of the touch tables or walls. In order to associate the information on the table or wall with the second customer, the second sales person can tap an icon or perform a gesture on their mobile device that will pull information from the cloud storage to list all of the customers that were recently scanned by the first sales person, a screen shot of which is shown in FIG. 25. Alternatively or additionally, there may be a secret gesture on the table or wall to retrieve the list of customers scanned that is kept confidential from customers. The second sales person can select from the list the name of the second customer, and this will then be equivalent to "logging in" as the second customer in our previous patent application. This selection may be realized by a gesture, e.g., "toss", a customer name from their mobile device to a table or wall, in order to change or initiate a user session on the table or wall to a particular customer.

Essentially the current user session on the touch table or wall can be associated with a particular person, so that at the end of the show, when a report is generated, the information from the session can be tied to a particular customer's name and info.

In addition, if during the user session, the user wants to email something to themselves, they can hit an email icon or button and their email address can be auto filled.

Alternatively or additionally, if the table or wall is unmanned by a sales person, a customer could approach the table or wall and hit log in and a list of names could appear on the table. The list would be downloaded from the cloud storage and contain a list of the most recent customers, e.g., five, ten, scanned by the first sales person elsewhere in the booth., and the customer could select their name to start a session. Instead of needing to "log in" to start a session and allowing people to log in as "guest," guest sessions may be active all of the time, so that a customer can come up and just start using the table or wall. Then, when they want to email something out to themselves, the list of recent customers scanned could be displayed and they would select their name or at this point a sales person could select their name with any of the above methods.

Additionally, after the first sales person scans a customer's badge with a mobile device, the customer's name and email address is now stored, which may then be further associated with the customer's mobile device, e.g., a mac address or some other id of their device. When that customer is at a table or wall, their proximity thereto is detected, their session could be autofilled with their information. Additionally or alternatively, the customer could place their mobile device at a spot on the table or wall and near field communication (NFC) or low energy blue tooth could be used to detect a phone.

In addition to badge scanning, other manners of collecting information may be used, e.g., bar codes, RFIDs, and so forth.

Sales people may also use mobile devices to show people products that are on the tables and walls, e.g., so user sessions may be started on the mobile device and then pull the data scanned from the cloud storage to associate a customer's name with the session. The mobile devices used by sales people to control user sessions on tables and walls, e.g., to pull the list of customers from the cloud storage, and select a customer for a user session on a table or wall.

By way of summation and review, embodiments provide a product with wireless connectivity options that are secure and provide an ease of use comparable to that of the current approaches. Embodiments also provide increased flexibility in a collaborative setting for both individual use and sharing.

Embodiments also provide session tracking, including obtaining information about an individual use and associated use of the display and/or use of the display over a given time period or event horizon, and generating reports based thereon.

Embodiments also provide a mobile device application allowing a mobile device to store the same files as those stored on the display computer, allowing a user of the mobile device to easily select a file to be displayed and efficiently display the selected file on an associated display within the same wireless network.

Embodiments also provide a mobile device application allowing a mobile device to store information on more than one customer, display a list on the mobile device, the table, and/or the wall, and associate the information with a session on the table or wall.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A system, comprising:
a large format display;
a display computer storing a plurality of files to be displayed on the large format display; and
multiple mobile devices for a corresponding number of first users, each mobile device including a mobile device application loaded thereon, the mobile device application to load and store user information for a second user, different from the first user, wherein, when the first user selects the second user using a gesture, the user information for the second user is sent from the mobile device of the first user to the display computer and the display computer starts a session for the second user on the large format display, wherein
each mobile device stores the plurality of files to be displayed on the large format display,
when data is changed or loaded onto the display computer, the mobile device application updates the mobile device to match to that of the display computer, and
selection of a file on the mobile device communicates a file identification to the display computer.

2. The system as claimed in claim 1, wherein the second user includes more than one second user such that a list of user information for the more than one second user is displayed.

3. The system as claimed in claim 2, wherein the list of user information is displayed on the mobile device.

4. The system as claimed in claim 2, wherein the list of user information is displayed on the large format display.

5. The system as claimed in claim 1, wherein the gesture results in a session on the mobile device being transferred to the large format display.

6. The system as claimed in claim 2, wherein the list of user information is stored in a storage cloud, the display computer and mobile devices having the mobile device application thereon accessing the list of user information form the storage cloud.

7. The system as claimed in claim 1, wherein the mobile device application loads the user information of the second user by communicating with an object of the second user.

8. The system as claimed in claim 7, wherein the object of the second user is a badge.

9. The system as claimed in claim 7, wherein the object of the second user is a mobile device of the second user.

10. The system as claimed in claim 9, wherein, once the user information of the second user has been stored, when the mobile device of the second user is within a predetermined distance of the large format display, the display computer is to automatically open a session on the large format display.

11. The system as claimed in claim 1, wherein, after the session has ended, information from that session is associated with the user information of the second user.

* * * * *